United States Patent
Zhang et al.

(10) Patent No.: US 12,328,666 B2
(45) Date of Patent: Jun. 10, 2025

(54) SIGNALING OF KEY PERFORMANCE INDICATOR METRICS FOR CELL SELECTION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 17/655,135

(22) Filed: Mar. 16, 2022

(65) Prior Publication Data

US 2023/0300737 A1  Sep. 21, 2023

(51) Int. Cl.
*H04W 74/0833* (2024.01)
*H04L 1/00* (2006.01)
*H04L 5/14* (2006.01)
*H04W 24/10* (2009.01)
*H04W 48/20* (2009.01)

(52) U.S. Cl.
CPC .......... *H04W 48/20* (2013.01); *H04L 1/0003* (2013.01); *H04L 5/14* (2013.01); *H04W 24/10* (2013.01); *H04W 74/0833* (2013.01)

(58) Field of Classification Search
CPC ..... H04W 36/08; H04W 48/20; H04W 48/18; H04W 36/00; H04W 74/0833; H04W 72/232; H04W 72/20; H04W 4/02; H04W 48/12; H04W 72/543; H04W 12/63; H04W 12/0471; H04W 72/512
See application file for complete search history.

(56) References Cited

U.S. PATENT DOCUMENTS 11,464,068 B1 * 10/2022 Marupaduga ......... H04W 76/19
2022/0210844 A1 * 6/2022 MolavianJazi ... H04W 74/0841

FOREIGN PATENT DOCUMENTS

WO    WO-2019023885 A1 * 2/2019 ........ H04W 36/0072

* cited by examiner

*Primary Examiner* — Tu X Nguyen
(74) *Attorney, Agent, or Firm* — Harrity & Harrity, LLP

(57) ABSTRACT

Various aspects of the present disclosure generally relate to wireless communication. Network entities that are capable of full duplex (FD) communication may exhibit reduced latency and increased throughput, among other performance benefits, as compared to half duplex (HD) network entities. Accordingly, in some aspects, a network entity may signal to a user equipment (UE) a duplex capability of a cell and/or one or more KPI metrics associated with the duplex capability of the cell during a cell selection process. The UE may perform the cell selection process based at least in part on the duplex capability of and/or the at least one KPI metric, thereby utilizing performance benefits of FD cells or the like. Numerous other aspects are described.

30 Claims, 12 Drawing Sheets

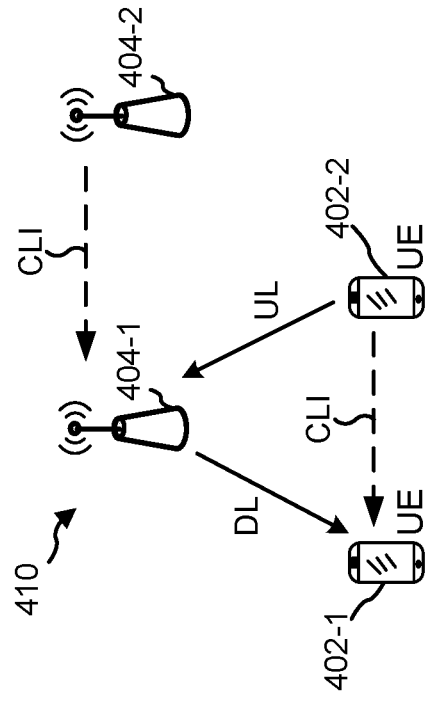
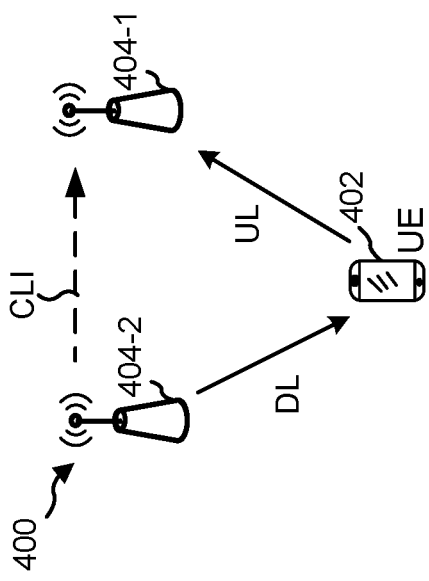
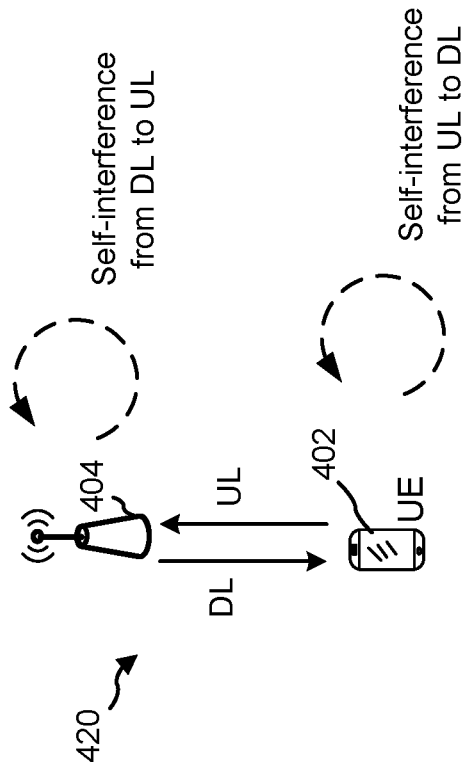
FIG. 4A
FIG. 4B
FIG. 4C

SIGNALING OF KEY PERFORMANCE INDICATOR METRICS FOR CELL SELECTION

FIELD OF THE DISCLOSURE

Aspects of the present disclosure generally relate to wireless communication and to techniques and apparatuses for signaling of key performance indicators for cell selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

Network entities, such as base stations and/or related components thereof, that are capable of full duplex (FD) communication may exhibit reduced latency and increased throughput, among other performance benefits, as compared to half duplex (HD) network entities. Moreover, different FD modes implemented by FD network entities and/or certain parameters of the different FD modes implemented by FD network entities, such as a minimum guard band between a downlink band and an uplink band, or the like, may result in different performance metrics at each network entity. However, during cell selection, a user equipment (UE) may not be aware of the duplex capability of each cell, the FD parameters associated with each cell, and/or any related performance metrics (e.g., latency, throughput, link quality) associated with each cell, which may lead to the UE selecting a candidate cell that exhibits increased latency as compared to other candidate cells, decreased throughput as compared to other candidate cells, degraded link quality as compared to other candidate cells, or the like.

Some techniques and apparatuses described herein enable signaling of a duplex capability of a network entity during a cell selection process and/or signaling of one or more key performance indicator (KPI) metrics during a cell selection process. More particularly, in some aspects, a UE may receive, from a network entity, an indication of a duplex capability of the cell and at least one KPI metric associated with the duplex capability of the cell. The indication of the duplex capability of the cell may indicate that the cell is capable of one of HD operation or FD operation and, if capable of FD operation, may indicate certain FD parameters such as that the cell is capable of spatial-division-multiplexed FD operation or frequency-division-multiplexed FD operation, and/or, when capable of frequency-division-multiplexed FD operation, may indicate a minimum guard band between an uplink band and a downlink band. The indication of the at least one KPI metric associated with the duplex capability may indicate one of a user perceived throughput associated with the cell, a downlink/uplink turnaround latency associated with the cell, a downlink/uplink coverage metric associated with the cell, or the like. In some aspects, the UE may perform a cell selection process based at least in part on the indication of the duplex capability of the cell and the at least one KPI metric associated with the duplex capability of the cell, such as by selecting an FD cell over an HD cell, and/or such as by selecting one FD cell over another FD cell based at least in part on a comparison of the respective KPI metrics. As a result, a candidate cell, of multiple candidate cells, exhibiting a highest performance may be selected by the UE, resulting in reduced latency, increased throughput, and overall efficient network resource usage.

Some aspects described herein relate to a method of wireless communication performed by a UE. The method may include receiving, from a network entity associated with a cell, an indication of a duplex capability of the cell and at least one KPI metric associated with the duplex capability of the cell. The method may include performing a cell selection process based at least in part on the indication of the duplex capability of the cell and the at least one KPI metric associated with the duplex capability of the cell.

Some aspects described herein relate to a method of wireless communication performed by a network entity. The method may include determining at least one KPI metric associated with a duplex capability of a cell associated with the network entity. The method may include transmitting, to a UE, an indication of the duplex capability of the cell and the at least one KPI metric associated with the duplex capability of the cell.

Some aspects described herein relate to an apparatus for wireless communication at a UE. The apparatus may include a memory and one or more processors coupled to the memory. The one or more processors may be configured to receive, from a network entity associated with a cell, an indication of a duplex capability of the cell and at least one KPI metric associated with the duplex capability of the cell. The one or more processors may be configured to perform a cell selection process based at least in part on the indication of the duplex capability of the cell and the at least one KPI metric associated with the duplex capability of the cell.

Some aspects described herein relate to an apparatus for wireless communication at a network entity. The apparatus may include a memory and one or more processors coupled to the memory. The one or more processors may be configured to determine at least one KPI metric associated with a duplex capability of a cell associated with the network entity. The one or more processors may be configured to transmit, to a UE, an indication of the duplex capability of the cell and the at least one KPI metric associated with the duplex capability of the cell.

Some aspects described herein relate to a non-transitory computer-readable medium that stores a set of instructions for wireless communication by a UE. The set of instructions, when executed by one or more processors of the UE, may cause the UE to receive, from a network entity associated with a cell, an indication of a duplex capability of the cell and at least one KPI metric associated with the duplex capability of the cell. The set of instructions, when executed by one or more processors of the UE, may cause the UE to perform a cell selection process based at least in part on the indication of the duplex capability of the cell and the at least one KPI metric associated with the duplex capability of the cell.

Some aspects described herein relate to a non-transitory computer-readable medium that stores a set of instructions for wireless communication by a network entity. The set of instructions, when executed by one or more processors of the network entity, may cause the network entity to determine at least one KPI metric associated with a duplex capability of a cell associated with the network entity. The set of instructions, when executed by one or more processors of the network entity, may cause the network entity to transmit, to a UE, an indication of the duplex capability of the cell and the at least one KPI metric associated with the duplex capability of the cell.

Some aspects described herein relate to an apparatus for wireless communication. The apparatus may include means for receiving, from a network entity associated with a cell, an indication of a duplex capability of the cell and at least one KPI metric associated with the duplex capability of the cell. The apparatus may include means for performing a cell selection process based at least in part on the indication of the duplex capability of the cell and the at least one KPI metric associated with the duplex capability of the cell.

Some aspects described herein relate to an apparatus for wireless communication. The apparatus may include means for determining at least one KPI metric associated with a duplex capability of a cell associated with the apparatus. The apparatus may include means for transmitting, to a UE, an indication of the duplex capability of the cell and the at least one KPI metric associated with the duplex capability of the cell.

Aspects generally include a method, apparatus, system, computer program product, non-transitory computer-readable medium, user equipment, base station, wireless communication device, and/or processing system as substantially described with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 4A-4C are diagrams illustrating examples of full duplex communication in accordance with the present disclosure.

DETAILED DESCRIPTION

Figure 1:
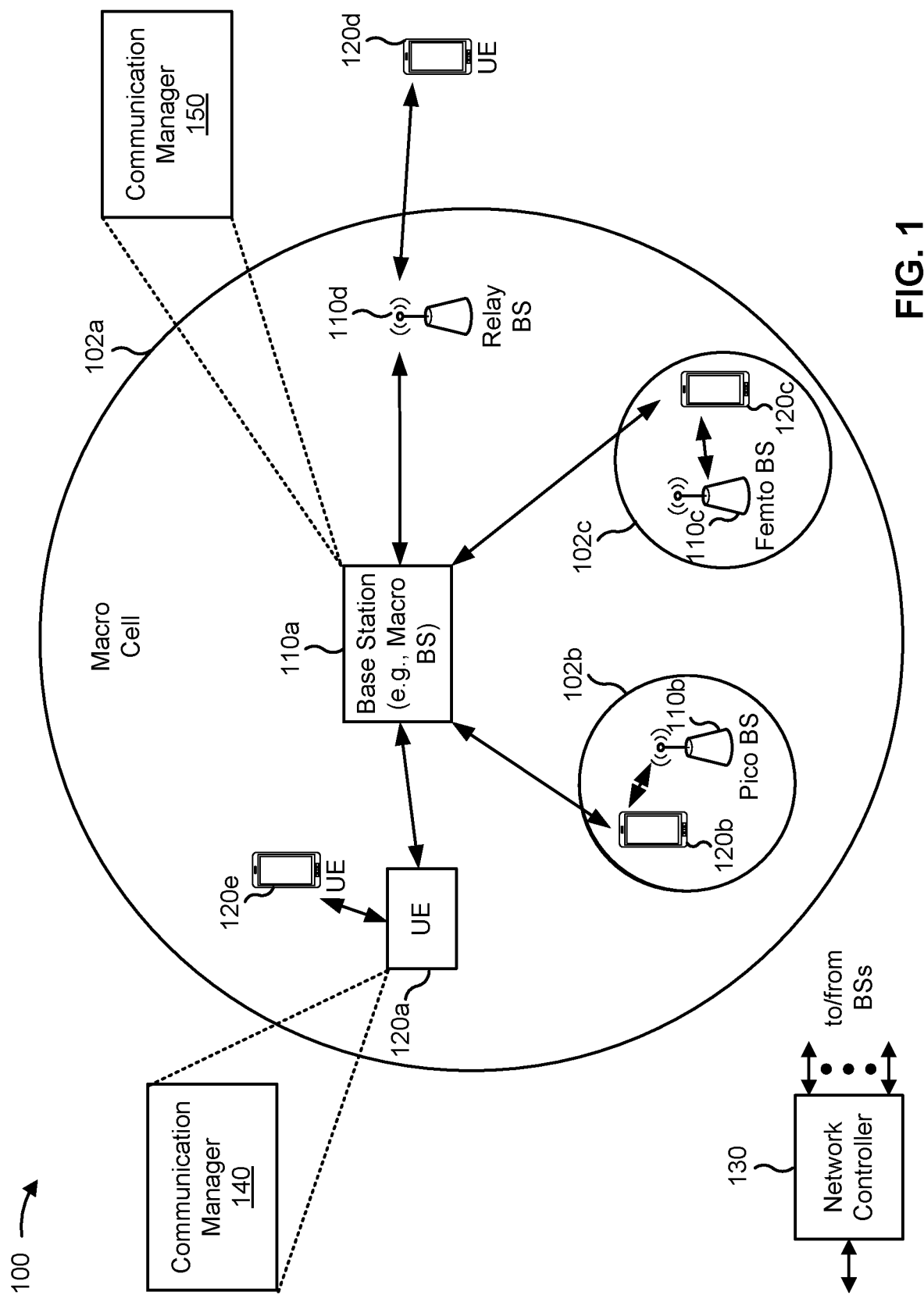
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity associated with a cell, an indication of a duplex capability of the cell and at least one key performance indicator (KPI) metric associated with the duplex capability of the cell; and perform a cell selection process based at least in part on the indication of the duplex capability of the cell and the at least one KPI metric associated with the duplex capability of the cell. Additionally, or alternatively, the communication manager 140 may perform one or more other operations described herein.

In some aspects, a network entity (e.g., the base station 110) may include a communication manager 150. As described in more detail elsewhere herein, the communication manager 150 may determine at least one KPI metric associated with a duplex capability of a cell associated with the network entity; and transmit, to a UE, an indication of the duplex capability of the cell and the at least one KPI metric associated with the duplex capability of the cell. Additionally, or alternatively, the communication manager 150 may perform one or more other operations described herein.

As indicated above, FIG. 1 is provided as an example. Other examples may differ from what is described with regard to FIG. 1.

Figure 2:
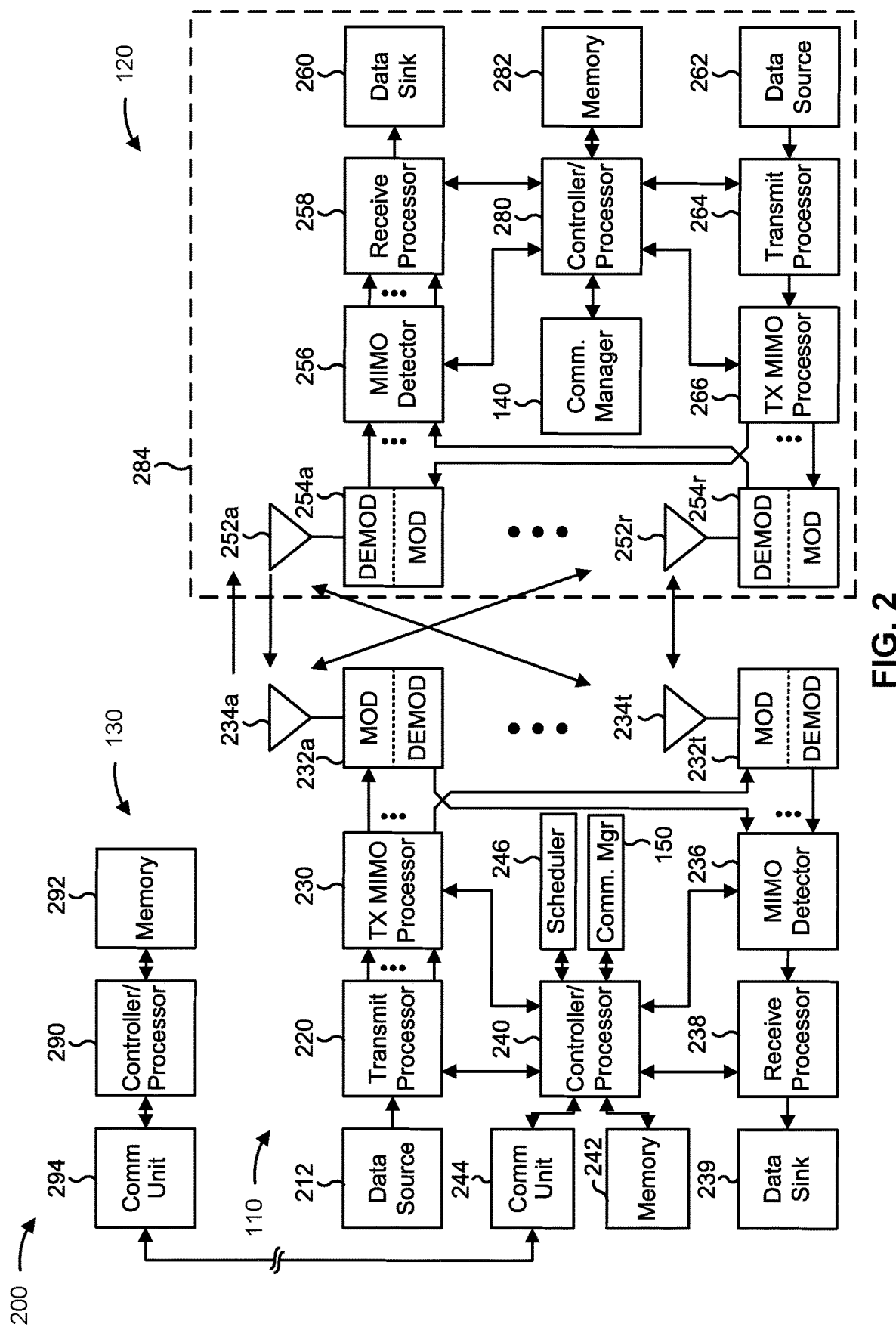
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with signaling of KPIs for cell selection, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network entity associated with a cell, an indication of a duplex capability of the cell and at least one KPI metric associated with the duplex capability of the cell; and/or means for performing a cell selection process based at least in part on the indication of the duplex capability of the cell and the at least one KPI metric associated with the duplex capability of the cell. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity (e.g., the base station 110) includes means for determining at least one KPI metric associated with a duplex capability of a cell associated with the network entity; and/or means for transmitting, to a UE, an indication of the duplex capability of the cell and the at least one KPI metric associated with the duplex capability of the cell. In some aspects, the means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
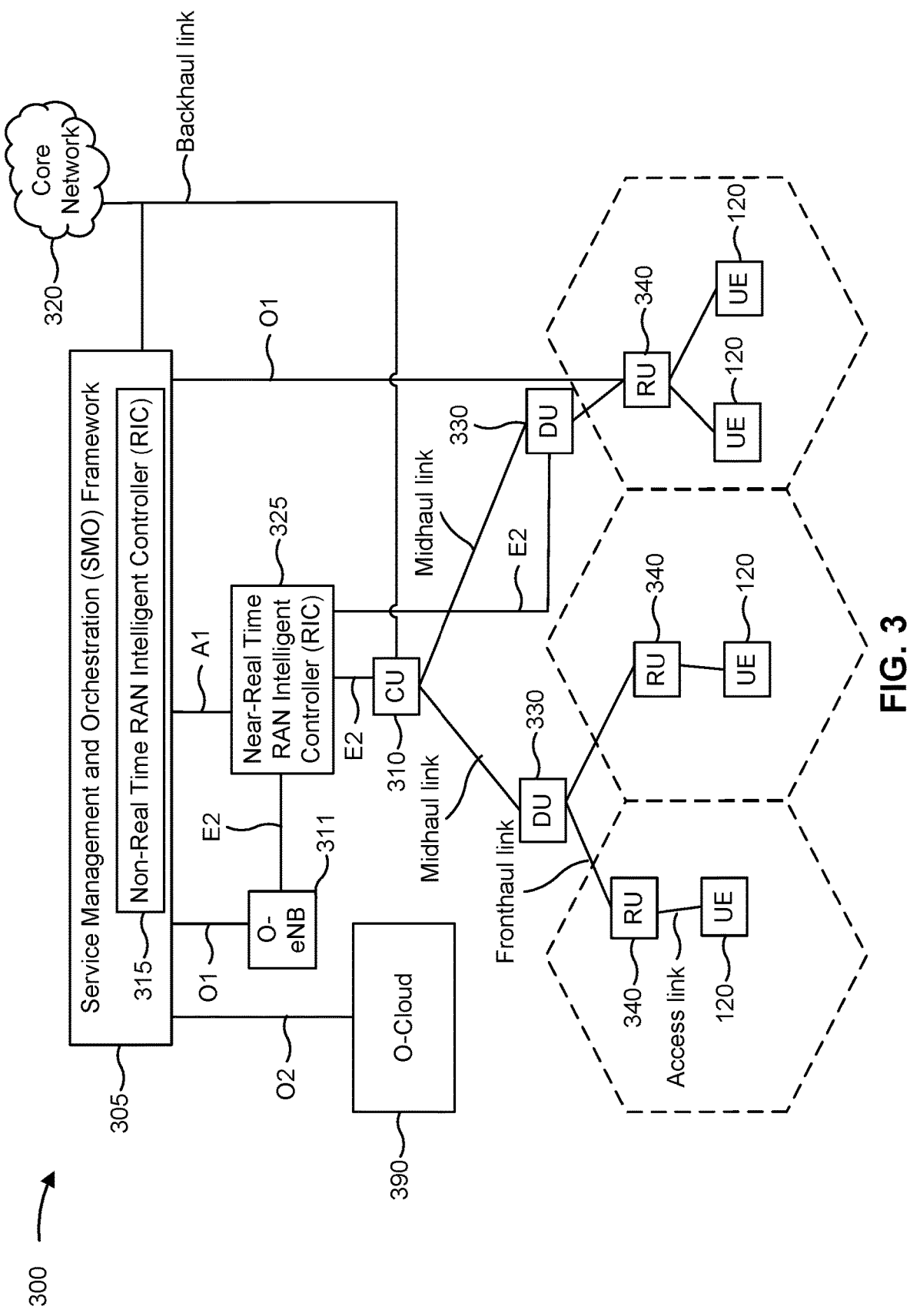
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU). "Network entity" or "network node" can refer to a disaggregated base station, or to one or more units of a disaggregated base station (such as one or more CUs, one or more DUs, one or more RUs, or a combination thereof). "Network entity" or "network node" can refer to a disaggregated base station, or to one or more units of a disaggregated base station (such as one or more CUs, one or more DUs, one or more RUs, or a combination thereof).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

FIGS. 4A-4C are diagrams illustrating examples 400, 410, 420 of full duplex (FD) communication in accordance with the present disclosure. An FD communication is a communication that utilizes overlapped time resources at a single node (such as a UE or a network entity, such as a TRP, a base station 110, a CU 310, a DU 330, or an RU 340) for transmission and reception. For example, a UE or a network entity may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 400 of FIG. 4A includes a UE 402 and two network entities 404 (e.g., a first network entity 404-1 and a second network entity 404-2), wherein the UE 402 is sending uplink transmissions to the first network entity 404-1 and is receiving downlink transmissions from the second network entity 404-2. In the example 400 of FIG. 4A, FD is enabled for the UE 402, but not for the network entities 404. Thus, the network entities 404 are half duplex (HD) network entities.

The example 410 of FIG. 4B includes two UEs 402 (e.g., a first UE 402-1 and a second UE 402-2), and a first network entity 404-1, wherein the first UE 402-1 is receiving a downlink transmission from the first network entity 404-1 and the second UE 402-2 is transmitting an uplink transmission to the first network entity 404-1. In the example 410 of FIG. 4B, FD is enabled for the first network entity 404-1, but not for the first UE 402-1 and the second UE 402-2. Thus, the first UE 402-1 and second UE 402-2 are HD UEs. The example 410 of FIG. 4B also includes a second network entity 404-2, which may cause interference to the first network entity 404-1, described in more detail below.

The example 420 of FIG. 4C includes a UE 402 and a network entity 404, wherein the UE 402 is receiving a downlink transmission from the network entity 404 and the UE 402 is transmitting an uplink transmission to the network entity 404. In the example 420 of FIG. 4C, FD is enabled for both the UE 402 and the network entity 404. In the example 420 of FIG. 4C, the UE 402 and the network entity 404 communicate using a beam pair. A beam pair may include a downlink beam and an uplink beam. For example, a UE 402 may use a beam pair that includes a downlink beam (that is, a receive beam) at the UE 402 and an uplink beam (that is, a transmit beam) at the UE 402 to communicate with the network entity 404. The network entity 404 may use a downlink beam (that is, a transmit beam) at the network entity 404 to transmit communications received via the UE 402's downlink beam, and may use an uplink beam (that is, a receive beam) at the network entity 404 to receive communications transmitted via the UE 402's uplink beam.

In FIGS. 4A-4C, interference is indicated by dashed lines. Interference can occur between nodes of examples 400, 410, 420 (referred to as "crosslink interference" (CLI)). Examples of CLI are shown in FIGS. 4A and 4B. In FIG. 4A, the second network entity 404-2's downlink transmission interferes with the first network entity 404-1's uplink transmission. In FIG. 4B, the first UE 402-1's uplink transmission interferes with the second UE 402-2's downlink transmission, and a downlink transmission of the second network entity 404-2 interferes with the first network entity 404-1's uplink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 402 (from an uplink transmission to a downlink reception) and at a network entity 404 (from a downlink transmission to an uplink reception) are shown in FIG. 4C. It should be noted that the above-described CLI and self-interference conditions can occur in HD deployments and in FD deployments.

In some aspects, network entities (e.g., network entities 404) operating in an FD mode may exhibit performance enhancements as compared to network entities operating in an HD mode. For example, when operating in an FD mode, a network entity may exhibit reduced latency and increased throughput, because the node is capable of handling both uplink and downlink traffic simultaneously (e.g., using overlapping time resources). Moreover, certain FD network entities may exhibit performance enhancements over other FD network entities. For example, one of a spatial-division-multiplexed (SDMed) FD network entity or a frequency-division-multiplexed (FDMed) FD network entity may exhibit performance enhancements as compared to the other one of the SDMed FD network entity or the FDMed FD network entity due to decreased interference (e.g., CLI, self-interference, or the like) and thus increased channel quality. Moreover, one FDMed FD node may exhibit performance enhancements over another FDMed FD node due to a wider guard band between downlink and uplink bands, which may improve link quality. However, when a UE (e.g., UE 402) is performing a cell selection or reselection process, the UE is unaware of the duplex capability of candidate cells, and thus may select a cell without regard to certain benefits that may arise from selecting certain cells, such as reduced latency, increased throughput, and/or improved link quality. Aspects of cell selection or reselection will be described in more detail in connection with FIG. 5.

As indicated above, FIGS. 4A-4C are provided as one or more examples. Other examples may differ from what is described with regard to FIGS. 4A-4C.

Figure 5:
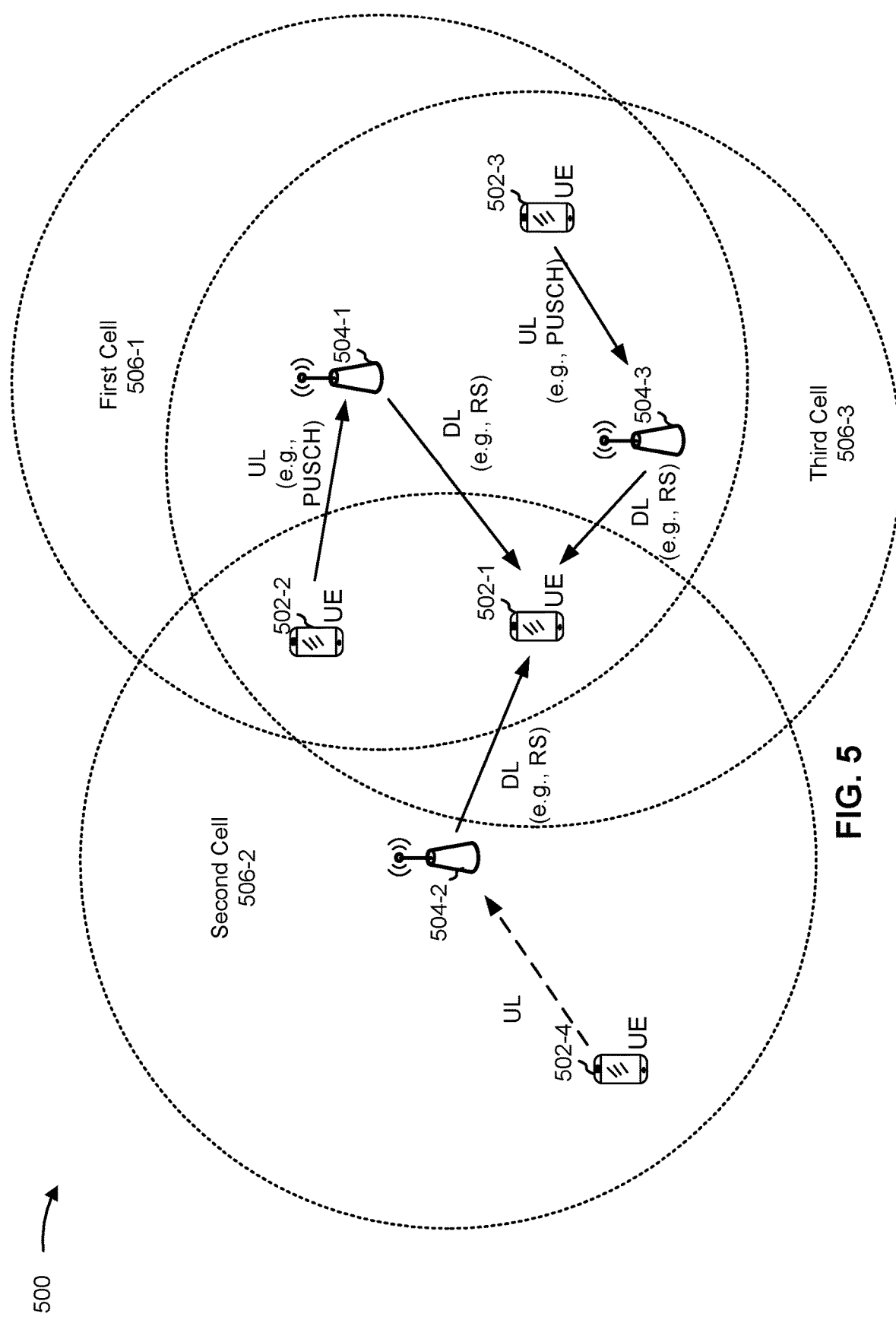
FIG. 5 is a diagram illustrating an example of a cell selection or reselection process, in accordance with the present disclosure.

FIG. 5 is a diagram illustrating an example 500 of a cell selection or reselection process, in accordance with the present disclosure.

In the example shown in FIG. 5, a first UE 502-1 is performing a cell selection or reselection process. In such cases, the first UE 502-1 may measure certain parameters associated with one or more candidate cells, and select one of the candidate cells (e.g., choose a cell in which to perform a random-access procedure in order to connect to the network) based at least in part on the measured parameters. More particularly, the first UE 502-1 may locate candidate cells by searching various frequencies for a broadcast signal (e.g., a synchronization signal (SS)/physical broadcast channel (PBCH) (SS/PBCH) block or the like), and/or the first UE 502-1 may search for certain cells using information from a pre-configured list of candidate cells configured by RRC signaling or the like. In the depicted example, the first UE 502-1 is within a first cell 506-1 associated with a first network entity 504-1, a second cell 506-2 associated with a second network entity 504-2, and a third cell 506-3 associated with a third network entity 504-3. Thus, the first cell 506-1, the second cell 506-2, and the third cell 506-3 may be candidate cells for selection.

Once one or more candidate cells are located, the first UE 502-1 may measure broadcast reference signals or the like to determine which one of the cells 506 the first UE 502-1 should select. For example, the first UE 502-1 may perform one or more of an RSRP measurement, an RSRQ measurement, or a signal-to-interference-plus-noise ratio (SINR) measurement on reference signals received from the first network entity 504-1, the second network entity 504-2, and/or the third network entity 504-3. In some aspects, the first UE 502-1 may select a cell having a highest link quality as evidenced by the measured RSRP, RSRQ, SINR, or the like.

When performing the above-described cell selection process, the first 502-1 may be unaware of the duplex capabilities of the candidate cells. For example, the first network entity 504-1 and the third network entity 504-3 may be capable of FD operation (e.g., may be capable of performing a transmission and a reception using the same time resources, such as via FDM or SDM), such as by communicating with a second UE 502-2 or a third UE 502-3, respectively, in the uplink while simultaneously communicating with another UE (e.g., the first UE 502-1) in the downlink. Moreover, the second network entity 504-2 may not be capable of FD operation (e.g., may be only capable of operating in an HD mode). Thus, as shown using a broken arrow in FIG. 5, the second network entity 504-2 cannot communicate with a fourth UE 502-4 in the uplink while communicating with another UE (e.g., the first UE 502-1) in the downlink. Instead, the second network entity 504-2 may use a first set of resources for communicating with the first UE 502-1 in the downlink, and a separate, second set of resources for communicating with the fourth UE 502-4 in the uplink.

As described above, because the first network entity 504-1 and the third network entity 504-3 are capable of FD communication, the first network entity 504-1 and/or the third network entity 504-3 may exhibit reduced latency and increased throughput as compared to HD network entities such as the second network entity 504-2. Moreover, due to a respective FD mode implemented by each of the first network entity 504-1 and the third network entity 504-3 (e.g., SDM or FDM) and/or certain parameters of the respective FD mode implemented by each of the first network entity 504-1 and the third network entity 504-3 (e.g., a minimum guard band between a downlink band and an uplink band, or the like), one of the first network entity 504-1 and the third network entity 504-3 may exhibit performance enhancements over the other one of the first network entity 504-1 and the third network entity 504-3, such as reduced interference and improved link quality. However, during cell selection, the first UE 502-1 may not be aware of the duplex capability of each network entity 504, the FD parameters associated with each network entity 504, and/or any related performance metrics (e.g., latency, throughput, link quality) of each network entity. This may lead to the first UE 502-1 selecting a HD cell (which is not capable of simultaneous uplink and downlink communication, as described) even though one or more FD cells are available (which is capable of simultaneous uplink and downlink communication, as described), thus resulting in increased latency as compared to other candidate cells, decreased throughput as compared to other candidate cells, and overall inefficient utilization of network resources.

Some techniques and apparatuses described herein enable signaling of a duplex capability of a network entity during a cell selection process and/or signaling of one or more KPI metrics during a cell selection process. More particularly, in some aspects, a UE (e.g., UE 120, UE 402, UE 502, or a similar UE) may receive, from a network entity (e.g., base station 110, CU 310, DU 330, RU 340, network entity 404, network entity 504, or a similar network entity), an indication of a duplex capability of the cell and at least one KPI metric associated with the duplex capability of the cell. The indication of the duplex capability of the cell may indicate that the cell is capable of one of HD operation or FD operation, and, if capable of FD operation, may indicate certain FD parameters such as that the cell is capable of SDMed FD operation or FDMed FD operation, and/or, when capable of FDMed FD operation, may indicate a minimum guard band between an uplink band and a downlink band. The indication of the at least one KPI metric associated with the duplex capability may indicate one of a user perceived throughput (UPT) associated with the cell, a downlink/uplink turnaround latency associated with the cell, a downlink/uplink coverage metric associated with the cell, or the like. In some aspects, the UE may perform a cell selection process based at least in part on the indication of the duplex capability of the cell and the at least one KPI metric associated with the duplex capability of the cell, such as by selecting an FD cell over an HD cell, and/or such as by selecting one FD cell over another FD cell based at least in part on a comparison of the respective KPI metrics. As a result, a cell, of multiple candidate cells, exhibiting a highest performance may be selected by the UE, resulting in reduced latency, increased throughput, and overall more efficient network resource utilization.

Figure 6:
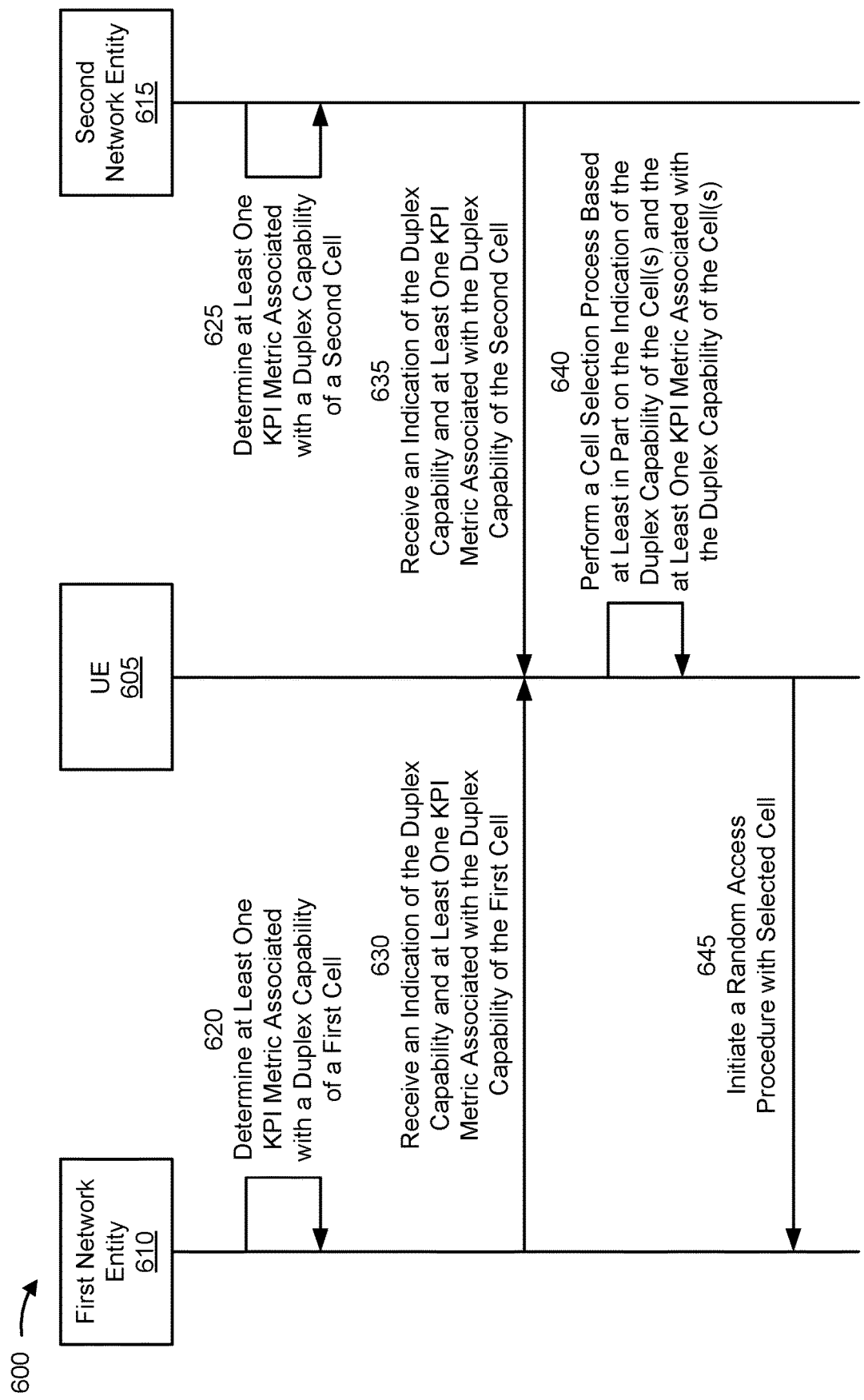
FIG. 6 is a diagram illustrating an example associated with signaling of key performance indicator metrics for cell selection, in accordance with the present disclosure.

FIG. 6 is a diagram illustrating an example 600 associated with signaling of KPI metrics for cell selection, in accordance with the present disclosure. As shown in FIG. 6, a UE 605 (e.g., UE 120, UE 402, or UE 502) may communicate with one or more network entities (e.g., base station 110, CU 310, DU 330, RU 340, network entity 404, network entity 504, or a similar network entity), such as a first network entity 610 and a second network entity 615. Moreover, each network entity 610, 615 may be associated with a cell, such as one of the cells 506 described in connection with FIG. 5. In some aspects, one or both of the cells may be capable of FD operation and/or one or both of the cells may be only capable of HD operation. More particularly, when one or both of the first network entity 610 or the second network entity 615 is capable of FD operation, the first network entity 610 or the second network entity 615 may correspond to one of the first network entity 504-1 or the third network entity 504-3 described in connection with FIG. 5. When one or both of the first network entity 610 or the second network entity 615 is not capable of FD operation (e.g., is only capable of HD operation), the first network entity 610 or the second network entity 615 may correspond to the second network entity 504-2 described in connection with FIG. 5.

As shown by reference numbers 620 and 625, in some aspects, the first network entity 610 and/or the second network entity 615, respectively, may determine at least one KPI metric associated with a duplex capability of a cell associated with the corresponding network entity 610, 615. In some aspects, determining the at least one KPI metric associated with the duplex capability of the cell may include measuring one or more metrics over a time period while operating in a certain duplex mode. For example, if one or both of the network entities 610, 615 are capable of operating in an FD mode, the one or both of the network entities 610, 615 may determine a first set of KPI metrics when operating in an HD mode, and may determine a second set of metrics when operating in the FD mode.

In some aspects, the at least one KPI metric associated with the duplex capability of the cell may be associated with at least one of a downlink or an uplink UPT metric associated with the cell. For FD network entities, this may include determining a downlink or uplink UPT when operating in an HD mode, as well as determining a downlink or uplink UPT when operating in an FD mode.

Additionally, or alternatively, the at least one KPI metric associated with the duplex capability of the cell may be a downlink/uplink turnaround latency metric associated with the cell. In some aspects, the downlink/uplink turnaround metric may include a turnaround time from a transmission of a downlink message to a reception of an uplink message, while, in some other aspects, the downlink/uplink turnaround metric may include a turnaround time from a reception of an uplink message to a transmission of a downlink message. For example, in some aspects, the downlink/uplink turnaround metric may be associated with a turnaround time from a physical downlink shared channel (PDSCH) message to an acknowledgement (ACK) message associated with the PDSCH message. In some other aspects, the downlink/uplink turnaround metric may be associated with a turnaround time from a scheduling request (SR) message to an uplink grant message associated with the SR message. In some other aspects, the downlink/uplink turnaround metric may be associated with a turnaround time from a random access channel (RACH) message (e.g., one of Msg1, Msg2, Msg3, or Msg4 of a four-step random access process, or one of MsgA or MsgB of a two-step random access process) to another RACH message (e.g., another one of Msg1, Msg2, Msg3, or Msg4 of a four-step random access process, or another one of MsgA or MsgB of a two-step random access process). Additionally, or alternatively, the downlink/uplink turnaround metric may be associated with a turnaround time from a first-in-time RACH message (e.g., one of Msg1 or MsgA) to a last-in-time RACH message (e.g., one of Msg4 or MsgB). Moreover, as described above, for FD network entities, the corresponding network entity may determine one or more downlink/uplink turnaround metrics when operating in an HD mode, as well as one or more downlink/uplink turnaround metrics when operating in an FD mode.

Additionally, or alternatively, in some aspects, the first network entity 610 and/or the second network entity 615 may determine and/or measure a downlink/uplink coverage metric associated with the cell. For example, the downlink/uplink coverage metric associated with the cell may be associated with a downlink RSRP threshold to achieve a minimum downlink data rate or MCS. Similarly, in some aspects, the downlink/uplink coverage metric associated with the cell may be associated with a path loss threshold to achieve a minimum downlink data rate or MCS. Additionally, or alternatively, the downlink/uplink coverage metric associated with the cell may be associated with an uplink RSRP threshold (e.g., an uplink transmit power minus a path loss threshold) to achieve a minimum uplink data rate or MCS. Moreover, as described above, for FD network entities, the corresponding network entity may determine one or more downlink/uplink coverage metrics when operating in an HD mode, as well as one or more downlink/uplink coverage metrics when operating in an FD mode.

As shown by reference numbers 630 and 635, the UE 605 may receive, from the first network entity 610 associated with the first cell and/or from the second network entity 615 associated with the second cell, respectively, an indication of a duplex capability of the corresponding cell and at least one KPI metric associated with the duplex capability of the corresponding cell. In some aspects, the indications shown by reference numbers 630 and 635 may be received as part of a cell selection process, as described in connection with FIG. 5. In that regard, the indications shown by reference numbers 630 and 635 may be broadcast so that various UEs (such as the UE 605 and other UEs) may receive the indications whether or not the UEs are in a connected mode with the first network entity 610 and/or the second network entity 615. For example, in some aspects, the indication of the duplex capability of the cell and the at least one KPI metric associated with the duplex capability of the cell may be received via a remaining minimum system information (RMSI) message broadcast by the corresponding network entity 610, 615.

In some other aspects, the UE 605 may be pre-configured with one or more candidate cells for cell selection. For example, when the UE 605 is in a connected state with a network entity (e.g., the first network entity 610, the second network entity 615, or another network entity), the UE 605 may receive a configuration of other candidate cells to be used during a subsequent cell selection or reselection process. In such aspects, the first cell and/or the second cell may thus be pre-configured candidate cells for cell selection, and the indication of the duplex capability of the cell and the at least one KPI metric associated with the duplex capability of the cell may be received via an RRC message (e.g., the UE 605 may receive the indications as part of a pre-configured list of candidate cells for future cell selection and/or reselection).

In some aspects, the indication of the duplex capability of the cell may indicate that the cell is capable of one of HD operation or FD operation. As described above in connection with FIGS. 4A-4C and FIG. 5, cells capable of FD operation may communicate utilizing overlapped time resources at a single node for transmission and reception, while cells capable of only HD operation do not utilize overlapped time resources (e.g., such cells only communicate in the uplink or the downlink at one time). For example, in aspects in which the first network entity 610 and/or the second network entity 615 correspond to one of the first network entity 504-1 or the third network entity 504-3 described in connection with FIG. 5, the indication of the duplex capability of the cell may indicate that the cell is capable of FD operation. On the other hand, in aspects in which the first network entity 610 and/or the second network entity 615 correspond to the second network entity 504-2 described in connection with FIG. 5, the indication of the duplex capability of the cell may indicate that the cell is capable of only HD operation.

In some aspects, if a cell is capable of FD operation, the indication of the duplex capability of the cell may further indicate certain parameters of the FD operation. For example, the indication of the duplex capability of the cell may further indicate that the cell is capable of one of SDMed FD operation or FDMed FD operation. Moreover, if the cell is capable of FDMed FD operation, the indication of the duplex capability of the cell may further indicate certain parameters of the frequency bands used to transmit and receive simultaneous communications, or the like. For example, the indication of the duplex capability of the cell may further indicate a minimum guard band used between an uplink band and a downlink band.

The indication of the at least one KPI metric associated with the duplex capability of the cell may indicate one or more metrics associated with the performance and/or quality of the cell, among other aspects, such as latency-related metrics, throughput-related metrics, coverage-related metrics, or the like. For example, the indication of the at least one KPI metric associated with the duplex capability of the cell may indicate one or more of the KPI metrics described above in connection with reference numbers 620 and 625. In that regard, the at least one KPI metric may be a downlink or an uplink UPT metric associated with the cell. Additionally, or alternatively, the at least one KPI metric may be a downlink/uplink turnaround latency metric associated with the cell, such as a turnaround time from a PDSCH message to an ACK message associated with the PDSCH message, a turnaround time from an SR message to an uplink grant message associated with the SR message, a turnaround time from a RACH message to another RACH message, and/or a turnaround time from a first-in-time RACH message to a last-in-time RACH message. Additionally, or alternatively, the at least one KPI metric may be a downlink/uplink coverage metric associated with the cell, such as a downlink RSRP threshold to achieve a minimum downlink data rate or MCS, a path loss threshold to achieve a minimum downlink data rate or MCS, and/or an uplink RSRP threshold to achieve a minimum uplink data rate or MCS.

In some aspects, the one or more KPI metrics may be indicated relative to a certain time period, such as a certain number of slots or the like. For example, the indications shown by reference numbers 630 and 635 may indicate an average value, over the time period, of the at least one KPI metric associated with the duplex capability of the cell. Additionally, or alternatively, the indications shown by reference numbers 630 and 635 may indicate a percentile value, over the time period, associated with the at least one KPI metric associated with the duplex capability of the cell. Additionally, or alternatively, the indications shown by reference numbers 630 and 635 may indicate a minimum value, over the time period, of the at least one KPI metric associated with the duplex capability of the cell. Additionally, or alternatively, the indications shown by reference numbers 630 and 635 may indicate a maximum value, over the time period, of the at least one KPI metric associated with the duplex capability of the cell. Additionally, or alternatively, the indications shown by reference numbers 630 and 635 may indicate a time-filtered value of the at least one KPI metric associated with the duplex capability of the cell.

As shown by reference number 640, the UE 605 may perform a cell selection process based at least in part on the indication of the duplex capabilities of one or both of the cells and the at least one KPI metric associated with the duplex capability of one or both of the cells. More particularly, as described above in connection with FIGS. 4A-4C and FIG. 5, an FD cell may exhibit performance enhancements as compared to an HD cell, and/or certain FD cells may exhibit performance enhancements as compared to other FD cells. Thus, rather than selecting a cell based solely on downlink measurements such as RSRP, RSRQ, SINR, or the like, in some aspects, the UE 605 may select a cell based at least in part on the indication of duplex capability of the selected cell (e.g., whether the selected cell is capable of FD operation, and, if so, certain parameters of the FD operation such as whether the cell uses SDM or FDM, what guard bands are utilized between uplink and downlink bands, or the like), and/or based at least in part on the at least one KPI metric associated with the duplex capability (e.g., a throughput-related metric associated with the FD or HD operation, a latency-related metric associated with the FD or HD operation, a coverage-related metric associated with the FD or HD operation, or the like).

In aspects in which the UE 605 receives indications of duplex capabilities of two or more cells and at least one KPI metric associated with the duplex capabilities of the two or more cells (as described in connection with reference numbers 630 and 635), the UE 605 may perform the cell selection process based at least in part on comparing the duplex capabilities of the various cells and/or based at least in part on comparing the at least one KPI metric associated with the duplex capabilities of the various cells. More particularly, in the example shown in FIG. 6, performing the cell selection process may include selecting the first cell (e.g., the cell associated with the first network entity 610) based at least in part on the indication of the duplex capability of the first cell indicating that the first cell is capable of FD operation and the indication of the duplex capability of the second cell (e.g., the cell associated with the second network entity 615) indicating that the second cell is not capable of FD operation (e.g., that the second cell is only capable of HD operation). In some other aspects, when the indications described in connection with reference numbers 630 and 635 indicate that both the first cell and the second cell are capable of FD operation, performing the cell selection process may include selecting the first cell based at least in part on comparing the at least one KPI metric associated with the duplex capability of the first cell with the at least one KPI metric associated with the duplex capability of the second cell. Similarly, when the indications described in connection with reference numbers 630 and 635 indicate that both the first cell and the second cell are not capable of FD operation (e.g., both cells are HD cells), performing the cell selection process may include selecting the first cell based at least in part on comparing the at least one KPI metric associated with the duplex capability of the first cell with the at least one KPI metric associated with the duplex capability of the second cell.

As shown by reference number 645, in some aspects, the UE 605 may initiate a connection procedure with the selected cell (e.g., with the cell selected based at least in part on the indication of the duplex capability of the cell and the at least one KPI metric associated with the duplex capability of the cell). For example, the UE 605 may initiate a random access procedure and/or another initial access procedure with the selected cell. In this way, the UE 605 may select a cell with knowledge of the duplex capability of the cell and the corresponding performance (e.g., KPI metrics) associated with the duplex capability of the cell, resulting in reduced latency, increased throughput, and more efficient network usage as compared to traditional cell selection processes.

As indicated above, FIG. 6 is provided as an example. Other examples may differ from what is described with respect to FIG. 6.

Figure 7:
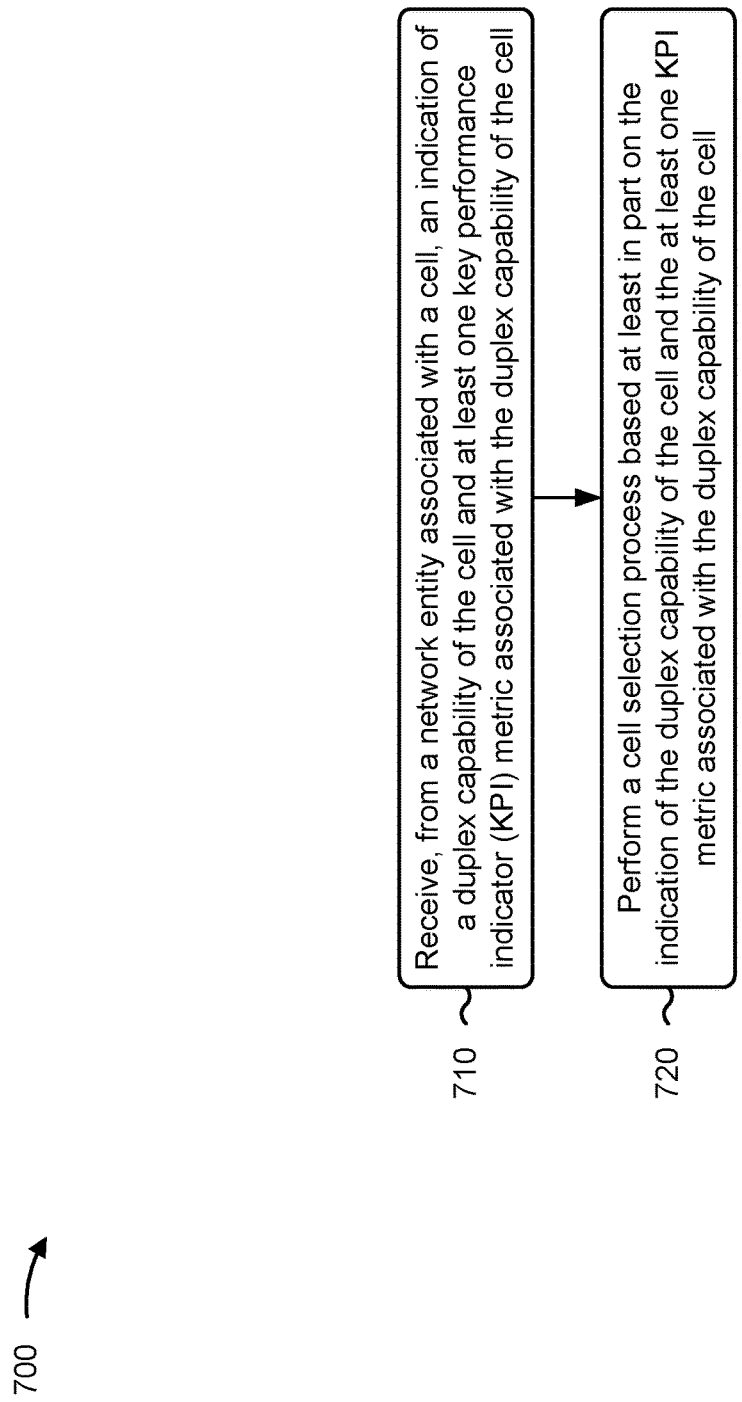
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 402, UE 502, UE 605) performs operations associated with signaling of KPI metrics for cell selection.

As shown in FIG. 7, in some aspects, process 700 may include receiving, from a network entity associated with a cell, an indication of a duplex capability of the cell and at least one KPI metric associated with the duplex capability of the cell (block 710). For example, the UE (e.g., using communication manager 908 and/or reception component 902, depicted in FIG. 9) may receive, from a network entity associated with a cell, an indication of a duplex capability of the cell and at least one KPI metric associated with the duplex capability of the cell, as described above.

As further shown in FIG. 7, in some aspects, process 700 may include performing a cell selection process based at least in part on the indication of the duplex capability of the cell and the at least one KPI metric associated with the duplex capability of the cell (block 720). For example, the UE (e.g., using communication manager 908 and/or selection component 910, depicted in FIG. 9) may perform a cell selection process based at least in part on the indication of the duplex capability of the cell and the at least one KPI metric associated with the duplex capability of the cell, as described above.

Process 700 may include additional aspects, such as any single aspect or any combination of aspects described below and/or in connection with one or more other processes described elsewhere herein.

In a first aspect, the indication of the duplex capability of the cell and the at least one KPI metric associated with the duplex capability of the cell is received via an RMSI message.

In a second aspect, alone or in combination with the first aspect, the cell is a pre-configured candidate cell for cell selection, and the indication of the duplex capability of the cell and the at least one KPI metric associated with the duplex capability of the cell is received via an RRC message.

In a third aspect, alone or in combination with one or more of the first and second aspects, the indication of the duplex capability of the cell indicates that the cell is capable of one of HD operation or FD operation.

In a fourth aspect, alone or in combination with one or more of the first through third aspects, the indication of the duplex capability of the cell indicates that the cell is capable of FD operation, and the indication of the duplex capability of the cell further indicates that the cell is capable of one of SDMed FD operation or FDMed FD operation.

In a fifth aspect, alone or in combination with one or more of the first through fourth aspects, the indication of the duplex capability of the cell further indicates that the cell is capable of FDMed FD operation, and the indication of the duplex capability of the cell further indicates a minimum guard band between an uplink band and a downlink band.

In a sixth aspect, alone or in combination with one or more of the first through fifth aspects, the indication of the at least one KPI metric associated with the duplex capability of the cell indicates at least one of a downlink or an uplink UPT metric associated with the cell.

In a seventh aspect, alone or in combination with one or more of the first through sixth aspects, the indication of the at least one KPI metric associated with the duplex capability of the cell indicates a downlink/uplink turnaround latency metric associated with the cell.

In an eighth aspect, alone or in combination with one or more of the first through seventh aspects, the downlink/uplink turnaround latency metric associated with the cell is associated with at least one of a turnaround time from a PDSCH message to an acknowledgement message associated with the PDSCH message, a turnaround time from an SR message to an uplink grant message associated with the SR message, a turnaround time from a RACH message to another RACH message, or a turnaround time from a first-in-time RACH message to a last-in-time RACH message.

In a ninth aspect, alone or in combination with one or more of the first through eighth aspects, the indication of the at least one KPI metric associated with the duplex capability of the cell indicates a downlink/uplink coverage metric associated with the cell.

In a tenth aspect, alone or in combination with one or more of the first through ninth aspects, the downlink/uplink coverage metric associated with the cell is associated with at least one of a downlink RSRP threshold to achieve a minimum downlink data rate or MCS, a path loss threshold to achieve a minimum downlink data rate or MCS, or an uplink RSRP threshold to achieve a minimum uplink data rate or MCS.

In an eleventh aspect, alone or in combination with one or more of the first through tenth aspects, the indication of the at least one KPI metric associated with the duplex capability of the cell includes at least one of an average value, over a time period, of the at least one KPI metric associated with the duplex capability of the cell, a percentile value, over the time period, associated with the at least one KPI metric associated with the duplex capability of the cell, a minimum value, over the time period, of the at least one KPI metric associated with the duplex capability of the cell, a maximum value, over the time period, of the at least one KPI metric associated with the duplex capability of the cell, or a time-filtered value of the at least one KPI metric associated with the duplex capability of the cell.

In a twelfth aspect, alone or in combination with one or more of the first through eleventh aspects, process 700 includes receiving, from another network entity associated with another cell, an indication of a duplex capability of the other cell and at least one KPI metric associated with the duplex capability of the other cell, wherein performing the cell selection process is further based at least in part on the indication of the duplex capability of the other cell and the at least one KPI metric associated with the duplex capability of the other cell.

In a thirteenth aspect, alone or in combination with one or more of the first through twelfth aspects, performing the cell selection process includes selecting the cell based at least in part on the indication of the duplex capability of the cell indicating that the cell is capable of FD operation and the indication of the duplex capability of the other cell indicating that the other cell is not capable of FD operation.

In a fourteenth aspect, alone or in combination with one or more of the first through thirteenth aspects, the indication of the duplex capability of the cell indicates that the cell is capable of FD operation and the indication of the duplex capability of the other cell indicates that the other cell is also capable of FD operation, and performing the cell selection process includes selecting the cell based at least in part on comparing the at least one KPI metric associated with the duplex capability of the cell with the at least one KPI metric associated with the duplex capability of the other cell.

In a fifteenth aspect, alone or in combination with one or more of the first through fourteenth aspects, the indication of the duplex capability of the cell indicates that the cell is not capable of FD operation and the indication of the duplex capability of the other cell indicates that the other cell is also not capable of FD operation, and performing the cell selection process includes selecting the cell based at least in part on comparing the at least one KPI metric associated with the duplex capability of the cell with the at least one KPI metric associated with the duplex capability of the other cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
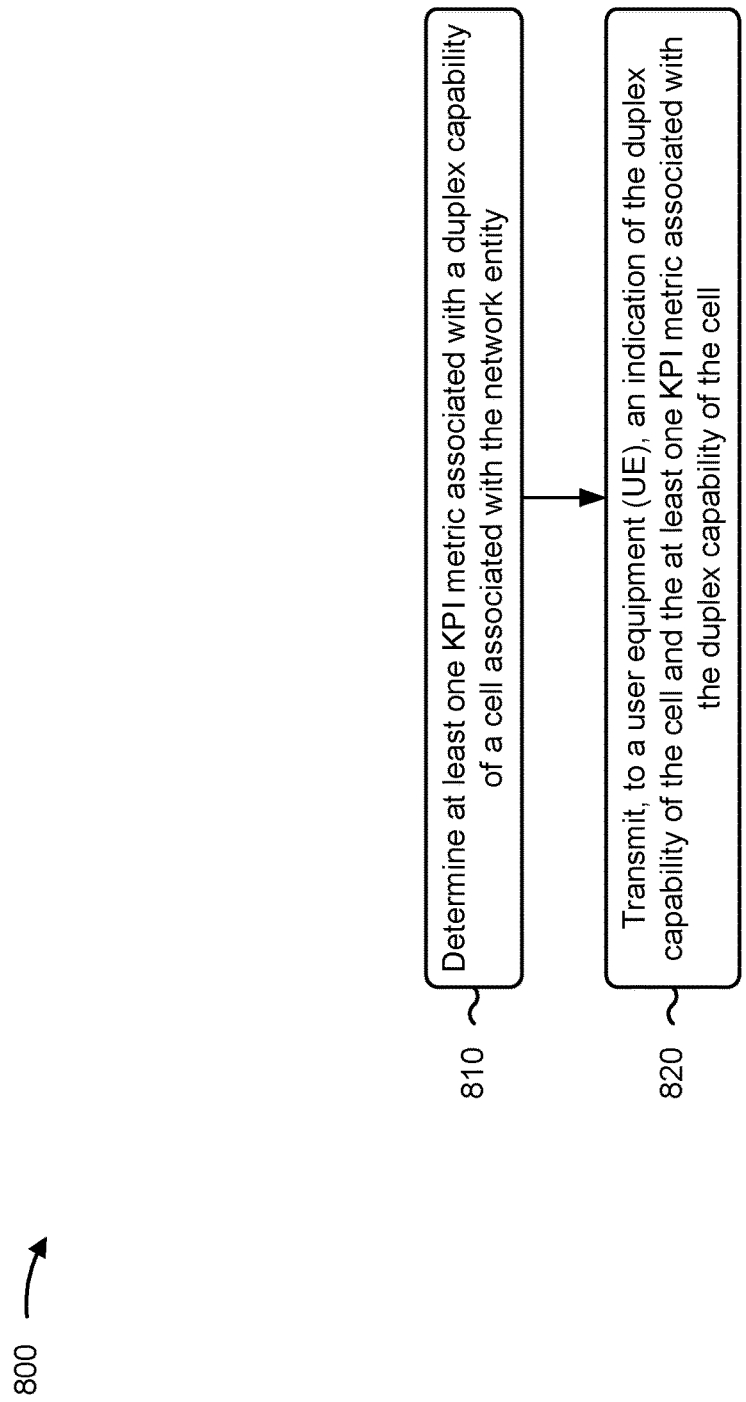
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110, CU 310, DU 330, RU 340, network entity 404, network entity 504, first network entity 610, or second network entity 615) performs operations associated with signaling of KPI metrics for cell selection.

As shown in FIG. 8, in some aspects, process 800 may include determining at least one KPI metric associated with a duplex capability of a cell associated with the network entity (block 810). For example, the network entity (e.g., using communication manager 1108 and/or determination component 1110, depicted in FIG. 11) may determine at least one KPI metric associated with a duplex capability of a cell associated with the network entity, as described above.

As further shown in FIG. 8, in some aspects, process 800 may include transmitting, to a UE, an indication of the duplex capability of the cell and the at least one KPI metric associated with the duplex capability of the cell (block 820). For example, the network entity (e.g., using communication manager 1108 and/or transmission component 1104, depicted in FIG. 11) may transmit, to a UE, an indication of the duplex capability of the cell and the at least one KPI metric associated with the duplex capability of the cell, as described above.

Process 800 may include additional aspects, such as any single aspect or any combination of aspects described below and/or in connection with one or more other processes described elsewhere herein.

In a first aspect, the indication of the duplex capability of the cell and the at least one KPI metric associated with the duplex capability of the cell is transmitted via an RMSI message.

In a second aspect, alone or in combination with the first aspect, the cell is a pre-configured cell for cell selection, and the indication of the duplex capability of the cell and the at least one KPI metric associated with the duplex capability of the cell is transmitted via an RRC message.

In a third aspect, alone or in combination with one or more of the first and second aspects, the indication of the duplex capability of the cell indicates that the cell is capable of one of HD operation or FD operation.

In a fourth aspect, alone or in combination with one or more of the first through third aspects, the indication of the duplex capability of the cell indicates that the cell is capable of FD operation, and the indication of the duplex capability of the cell further indicates that the cell is capable of one of SDMed FD operation or FDMed FD operation.

In a fifth aspect, alone or in combination with one or more of the first through fourth aspects, the indication of the duplex capability of the cell further indicates that the cell is capable of FDMed FD operation, and the indication of the duplex capability of the cell further indicates a minimum guard band between an uplink band and a downlink band.

In a sixth aspect, alone or in combination with one or more of the first through fifth aspects, the indication of the at least one KPI metric associated with the duplex capability of the cell indicates at least one of a downlink or an uplink UPT metric associated with the cell.

In a seventh aspect, alone or in combination with one or more of the first through sixth aspects, the indication of the at least one KPI metric associated with the duplex capability of the cell indicates a downlink/uplink turnaround latency metric associated with the cell.

In an eighth aspect, alone or in combination with one or more of the first through seventh aspects, the downlink/uplink turnaround latency metric associated with the cell is associated with at least one of a turnaround time from a PDSCH message to an ACK message associated with the PDSCH message, a turnaround time from an SR message to an uplink grant message associated with the SR message, a turnaround time from a RACH message to another RACH message, or a turnaround time from a first-in-time RACH message to a last-in-time RACH message.

In a ninth aspect, alone or in combination with one or more of the first through eighth aspects, the indication of the at least one KPI metric associated with the duplex capability of the cell indicates a downlink/uplink coverage metric associated with the cell.

In a tenth aspect, alone or in combination with one or more of the first through ninth aspects, the downlink/uplink coverage metric associated with the cell is associated with at least one of a downlink RSRP threshold to achieve a minimum downlink data rate or MCS, a path loss threshold to achieve a minimum downlink data rate or MCS, or an uplink RSRP threshold to achieve a minimum uplink data rate or MCS.

In an eleventh aspect, alone or in combination with one or more of the first through tenth aspects, the indication of the at least one KPI metric associated with the duplex capability of the cell includes at least one of an average value, over a time period, of the at least one KPI metric associated with the duplex capability of the cell, a percentile value, over the time period, associated with the at least one KPI metric associated with the duplex capability of the cell, a minimum value, over the time period, of the at least one KPI metric associated with the duplex capability of the cell, a maximum value, over the time period, of the at least one KPI metric associated with the duplex capability of the cell, or a time-filtered value of the at least one KPI metric associated with the duplex capability of the cell.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
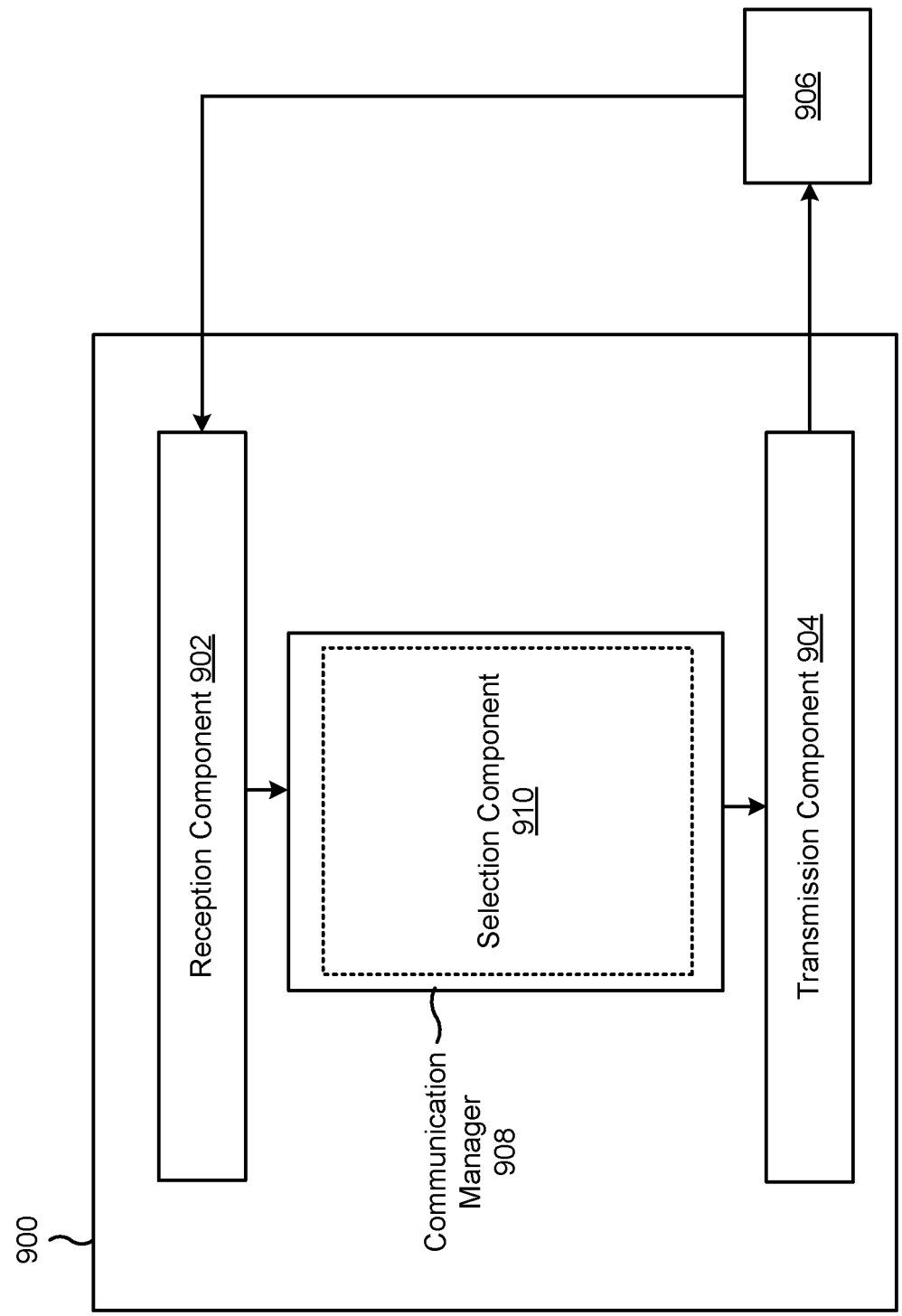
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE (e.g., UE 605), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, a network entity, or another wireless communication device) using the reception component 902 and the transmission component 904. As further shown, the apparatus 900 may include the communication manager 908 (e.g., communication manager 140). The communication manager 908 may include a selection component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE 120 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE 120 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE 120 described in connection with FIG. 2. In some aspects, the transmission component 904 may be co-located with the reception component 902 in a transceiver.

The reception component 902 may receive, from a network entity associated with a cell, an indication of a duplex capability of the cell and at least one KPI metric associated with the duplex capability of the cell. The selection component 910 may perform a cell selection process based at least in part on the indication of the duplex capability of the cell and the at least one KPI metric associated with the duplex capability of the cell.

The reception component 902 may receive, from another network entity associated with another cell, an indication of a duplex capability of the other cell and at least one KPI metric associated with the duplex capability of the other cell, wherein performing the cell selection process is further based at least in part on the indication of the duplex capability of the other cell and the at least one KPI metric associated with the duplex capability of the other cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
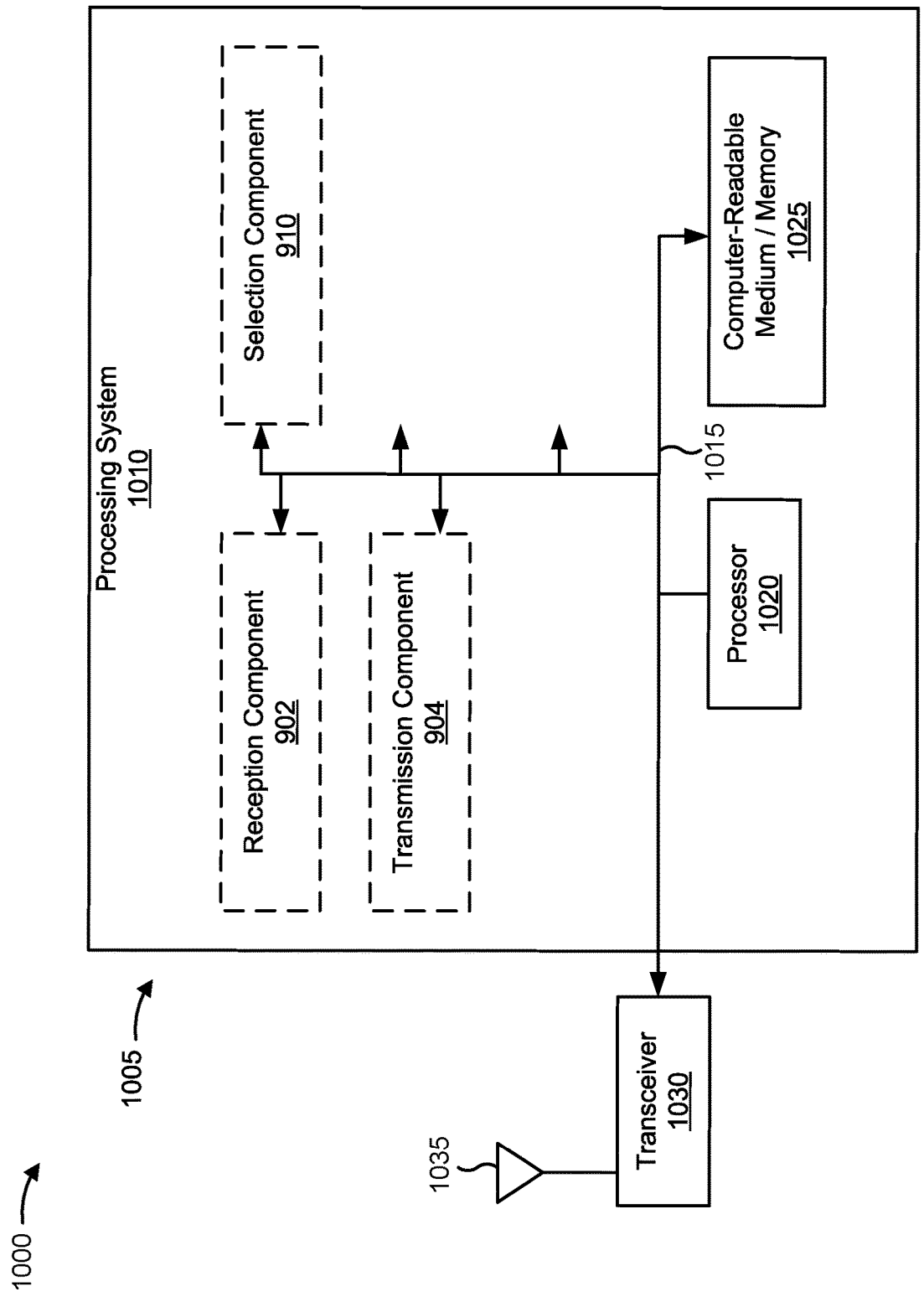
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010, in accordance with the present disclosure. The apparatus 1005 may be a UE (e.g., UE 605).

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer-readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the receive processor 258, and/or the controller/processor 280. In some aspects, the apparatus 1005 for wireless communication includes means for receiving, from a network entity associated with a cell, an indication of a duplex capability of the cell and at least one KPI metric associated with the duplex capability of the cell; and/or means for performing a cell selection process based at least in part on the indication of the duplex capability of the cell and the at least one KPI metric associated with the duplex capability of the cell. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 10 is provided as an example. Other examples may differ from what is described in connection with FIG. 10.

Figure 11:
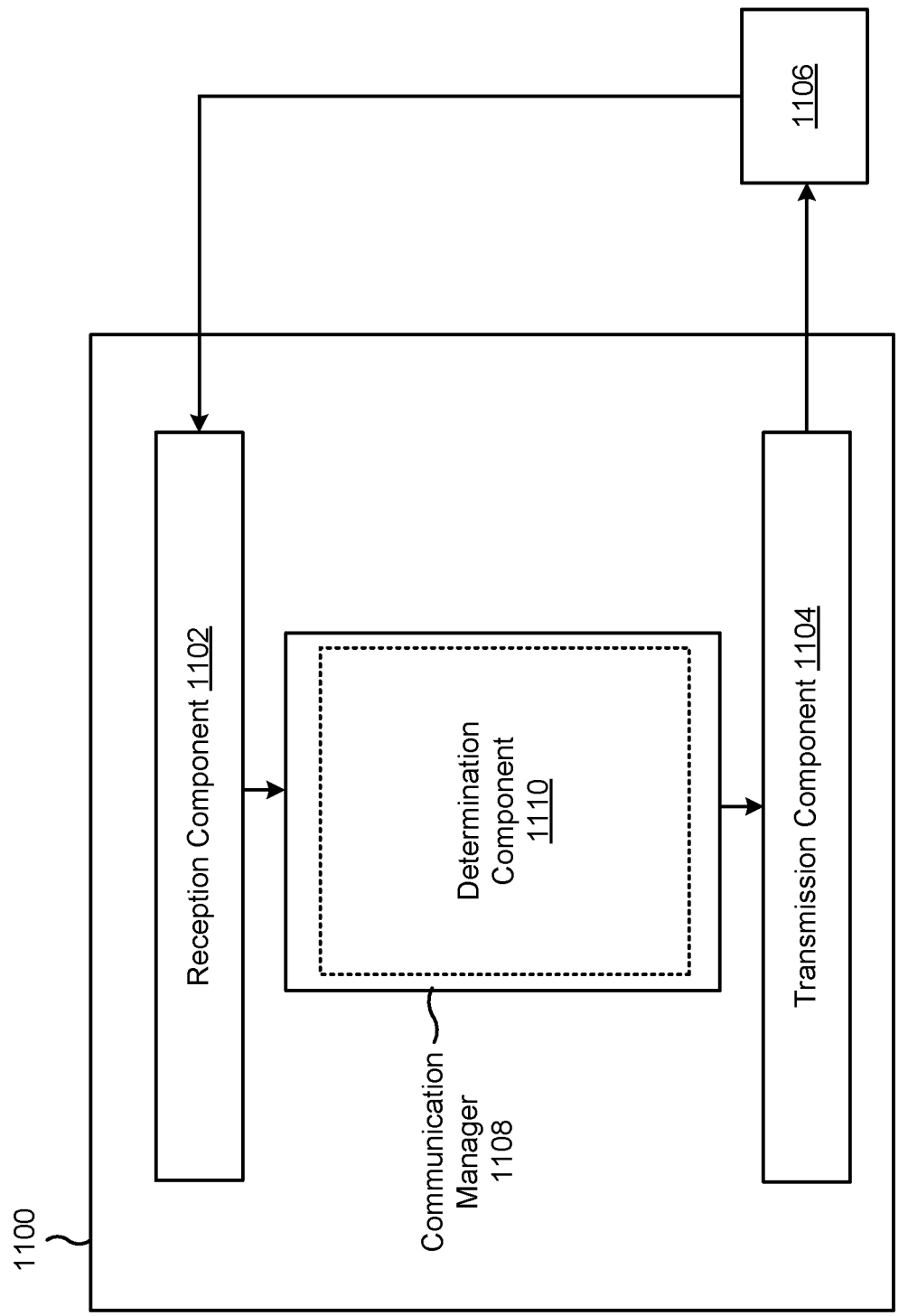
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network entity (e.g., base station 110, CU 310, DU 330, RU 340, network entity 404, network entity 504, first network entity 610, or second network entity 615), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a network entity, or another wireless communication device) using the reception component 1102 and the transmission component 1104. As further shown, the apparatus 1100 may include the communication manager 1108 (e.g., communication manager 150). The communication manager 1108 may include a determination component 1110, among other examples.

In some aspects, the apparatus 1100 may be configured to perform one or more operations described herein in connection with FIG. 6. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the base station 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station 110 described in connection with FIG. 2. In some aspects, the transmission component 1104 may be co-located with the reception component 1102 in a transceiver.

The determination component 1110 may determine at least one KPI metric associated with a duplex capability of a cell associated with the network entity. The transmission component 1104 may transmit, to a UE, an indication of the duplex capability of the cell and the at least one KPI metric associated with the duplex capability of the cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
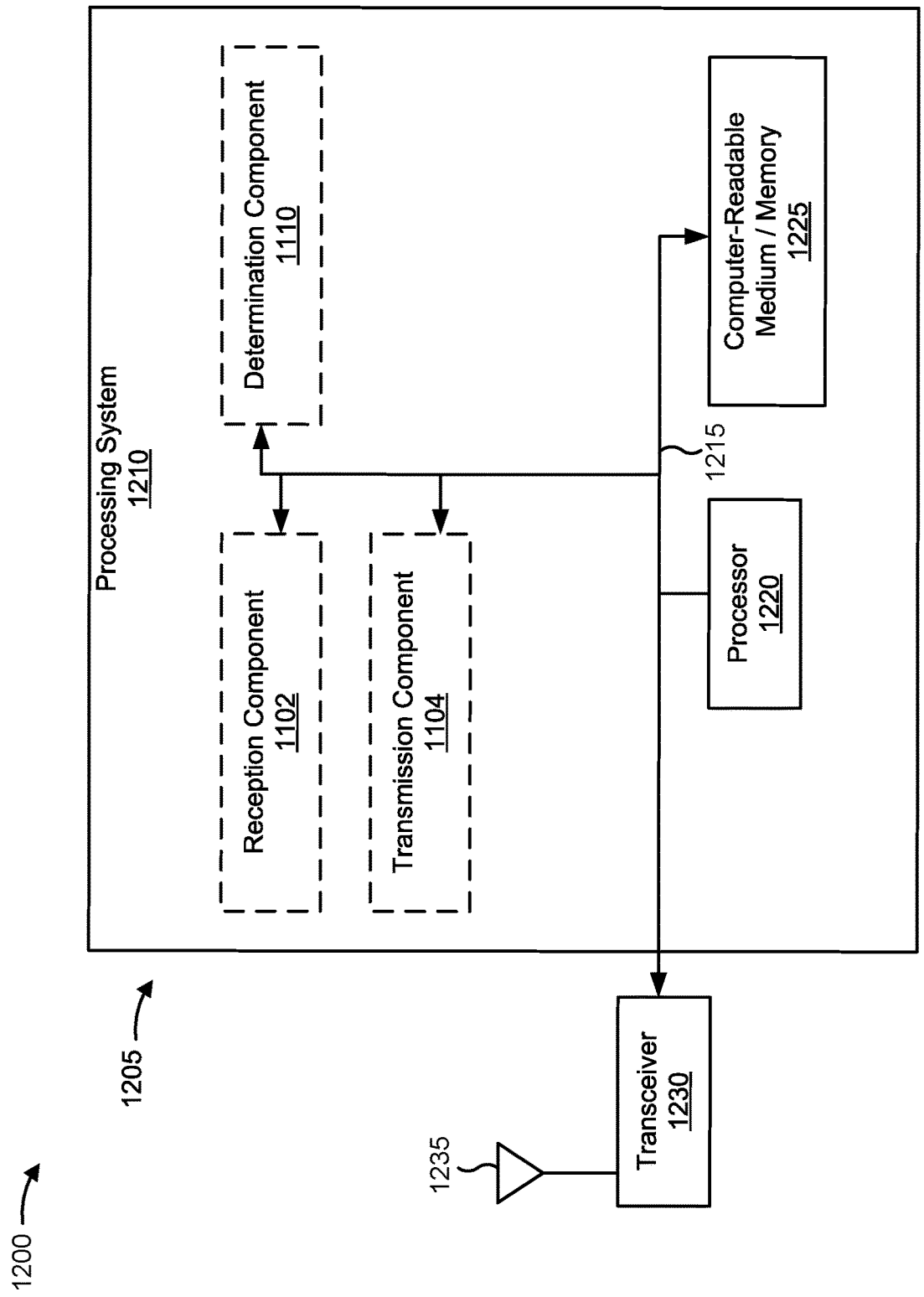
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210, in accordance with the present disclosure. The apparatus 1205 may be a network entity (e.g., the first network entity 610 and/or the second network entity 615).

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer-readable medium/memory 1225, one or more hardware modules coupled to the processor 1220, or some combination thereof.

In some aspects, the processing system 1210 may be a component of the base station 110 and may include the memory 242 and/or at least one of the TX MIMO processor 230, the receive processor 238, and/or the controller/processor 240. In some aspects, the apparatus 1205 for wireless communication includes means for determining at least one KPI metric associated with a duplex capability of a cell associated with the apparatus; and/or means for transmitting, to a UE, an indication of the duplex capability of the cell and the at least one KPI metric associated with the duplex capability of the cell. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a UE, comprising: receiving, from a network entity associated with a cell, an indication of a duplex capability of the cell and at least one KPI metric associated with the duplex capability of the cell; and performing a cell selection process based at least in part on the indication of the duplex capability of the cell and the at least one KPI metric associated with the duplex capability of the cell.

Aspect 2: The method of Aspect 1, wherein the indication of the duplex capability of the cell and the at least one KPI metric associated with the duplex capability of the cell is received via a remaining minimum system information message.

Aspect 3: The method of any of Aspects 1-2, wherein the cell is a pre-configured candidate cell for cell selection, and wherein the indication of the duplex capability of the cell and the at least one KPI metric associated with the duplex capability of the cell is received via a radio resource control message.

Aspect 4: The method of any of Aspects 1-3, wherein the indication of the duplex capability of the cell indicates that the cell is capable of one of half duplex operation or full duplex operation.

Aspect 5: The method of Aspect 4, wherein the indication of the duplex capability of the cell indicates that the cell is capable of full duplex operation, and wherein the indication of the duplex capability of the cell further indicates that the cell is capable of one of spatial-division-multiplexed full duplex operation or frequency-division-multiplexed full duplex operation.

Aspect 6: The method of Aspect 5, wherein the indication of the duplex capability of the cell further indicates that the cell is capable of frequency-division-multiplexed full duplex operation, and wherein the indication of the duplex capability of the cell further indicates a minimum guard band between an uplink band and a downlink band.

Aspect 7: The method of any of Aspects 1-6, wherein the indication of the at least one KPI metric associated with the duplex capability of the cell indicates at least one of a downlink or an uplink user perceived throughput metric associated with the cell.

Aspect 8: The method of any of Aspects 1-7, wherein the indication of the at least one KPI metric associated with the duplex capability of the cell indicates a downlink/uplink turnaround latency metric associated with the cell.

Aspect 9: The method of Aspect 8, wherein the downlink/uplink turnaround latency metric associated with the cell is associated with at least one of: a turnaround time from a PDSCH message to an acknowledgement message associated with the PDSCH message, a turnaround time from a scheduling request message to an uplink grant message associated with the scheduling request message, a turnaround time from a RACH message to another RACH message, or a turnaround time from a first-in-time RACH message to a last-in-time RACH message.

Aspect 10: The method of any of Aspects 1-9, wherein the indication of the at least one KPI metric associated with the duplex capability of the cell indicates a downlink/uplink coverage metric associated with the cell.

Aspect 11: The method of Aspect 10, wherein the downlink/uplink coverage metric associated with the cell is associated with at least one of: a downlink RSRP threshold to achieve a minimum downlink data rate or MCS, a path loss threshold to achieve a minimum downlink data rate or MCS, or an uplink RSRP threshold to achieve a minimum uplink data rate or MCS.

Aspect 12: The method of any of Aspects 1-11, wherein the indication of the at least one KPI metric associated with the duplex capability of the cell includes at least one of: an average value, over a time period, of the at least one KPI metric associated with the duplex capability of the cell, a percentile value, over the time period, associated with the at least one KPI metric associated with the duplex capability of the cell, a minimum value, over the time period, of the at least one KPI metric associated with the duplex capability of the cell, a maximum value, over the time period, of the at least one KPI metric associated with the duplex capability of the cell, or a time-filtered value of the at least one KPI metric associated with the duplex capability of the cell.

Aspect 13: The method of any of Aspects 1-12, further comprising: receiving, from another network entity associated with another cell, an indication of a duplex capability of the other cell and at least one KPI metric associated with the duplex capability of the other cell, wherein performing the cell selection process is further based at least in part on the indication of the duplex capability of the other cell and the at least one KPI metric associated with the duplex capability of the other cell.

Aspect 14: The method of Aspect 13, wherein performing the cell selection process includes selecting the cell based at least in part on the indication of the duplex capability of the cell indicating that the cell is capable of full duplex operation and the indication of the duplex capability of the other cell indicating that the other cell is not capable of full duplex operation.

Aspect 15: The method of Aspect 13, wherein the indication of the duplex capability of the cell indicates that the cell is capable of full duplex operation and the indication of the duplex capability of the other cell indicates that the other cell is also capable of full duplex operation, and wherein performing the cell selection process includes selecting the cell based at least in part on comparing the at least one KPI metric associated with the duplex capability of the cell with the at least one KPI metric associated with the duplex capability of the other cell.

Aspect 16: The method of Aspect 13, wherein the indication of the duplex capability of the cell indicates that the cell is not capable of full duplex operation and the indication of the duplex capability of the other cell indicates that the other cell is also not capable of full duplex operation, and wherein performing the cell selection process includes selecting the cell based at least in part on comparing the at least one KPI metric associated with the duplex capability of the cell with the at least one KPI metric associated with the duplex capability of the other cell.

Aspect 17: A method of wireless communication performed by a network entity, comprising: determining at least one KPI metric associated with a duplex capability of a cell associated with the network entity; and transmitting, to a UE, an indication of the duplex capability of the cell and the at least one KPI metric associated with the duplex capability of the cell.

Aspect 18: The method of Aspect 17, wherein the indication of the duplex capability of the cell and the at least one KPI metric associated with the duplex capability of the cell is transmitted via a remaining minimum system information message.

Aspect 19: The method of any of Aspects 17-18, wherein the cell is a pre-configured cell for cell selection, and wherein the indication of the duplex capability of the cell and the at least one KPI metric associated with the duplex capability of the cell is transmitted via a radio resource control message.

Aspect 20: The method of any of Aspects 17-19, wherein the indication of the duplex capability of the cell indicates that the cell is capable of one of half duplex operation or full duplex operation.

Aspect 21: The method of Aspect 20, wherein the indication of the duplex capability of the cell indicates that the cell is capable of full duplex operation, and wherein the indication of the duplex capability of the cell further indicates that the cell is capable of one of spatial-division-multiplexed full duplex operation or frequency-division-multiplexed full duplex operation.

Aspect 22: The method of Aspect 21, wherein the indication of the duplex capability of the cell further indicates that the cell is capable of frequency-division-multiplexed full duplex operation, and wherein the indication of the duplex capability of the cell further indicates a minimum guard band between an uplink band and a downlink band.

Aspect 23: The method of any of Aspects 17-22, wherein the indication of the at least one KPI metric associated with the duplex capability of the cell indicates at least one of a downlink or an uplink user perceived throughput metric associated with the cell.

Aspect 24: The method of any of Aspects 17-23, wherein the indication of the at least one KPI metric associated with the duplex capability of the cell indicates a downlink/uplink turnaround latency metric associated with the cell.

Aspect 25: The method of Aspect 24, wherein the downlink/uplink turnaround latency metric associated with the cell is associated with at least one of: a turnaround time from a PDSCH message to an acknowledgement message associated with the PDSCH message, a turnaround time from a scheduling request message to an uplink grant message associated with the scheduling request message, a turnaround time from a RACH message to another RACH message, or a turnaround time from a first-in-time RACH message to a last-in-time RACH message.

Aspect 26: The method of any of Aspects 17-25, wherein the indication of the at least one KPI metric associated with the duplex capability of the cell indicates a downlink/uplink coverage metric associated with the cell.

Aspect 27: The method of Aspect 26, wherein the downlink/uplink coverage metric associated with the cell is associated with at least one of: a downlink RSRP threshold to achieve a minimum downlink data rate or MCS, a path loss threshold to achieve a minimum downlink data rate or MCS, or an uplink RSRP threshold to achieve a minimum uplink data rate or MCS.

Aspect 28: The method of any of Aspects 17-27, wherein the indication of the at least one KPI metric associated with the duplex capability of the cell includes at least one of: an average value, over a time period, of the at least one KPI metric associated with the duplex capability of the cell, a percentile value, over the time period, associated with the at least one KPI metric associated with the duplex capability of the cell, a minimum value, over the time period, of the at least one KPI metric associated with the duplex capability of the cell, a maximum value, over the time period, of the at least one KPI metric associated with the duplex capability of the cell, or a time-filtered value of the at least one KPI metric associated with the duplex capability of the cell.

Aspect 29: An apparatus for wireless communication at a device, comprising a processor; memory coupled with the processor; and instructions stored in the memory and executable by the processor to cause the apparatus to perform the method of one or more of Aspects 1-16.

Aspect 30: A device for wireless communication, comprising a memory and one or more processors coupled to the memory, the one or more processors configured to perform the method of one or more of Aspects 1-16.

Aspect 31: An apparatus for wireless communication, comprising at least one means for performing the method of one or more of Aspects 1-16.

Aspect 32: A non-transitory computer-readable medium storing code for wireless communication, the code comprising instructions executable by a processor to perform the method of one or more of Aspects 1-16.

Aspect 33: A non-transitory computer-readable medium storing a set of instructions for wireless communication, the set of instructions comprising one or more instructions that, when executed by one or more processors of a device, cause the device to perform the method of one or more of Aspects 1-16.

Aspect 34: An apparatus for wireless communication at a device, comprising a processor; memory coupled with the processor; and instructions stored in the memory and executable by the processor to cause the apparatus to perform the method of one or more of Aspects 17-28.

Aspect 35: A device for wireless communication, comprising a memory and one or more processors coupled to the memory, the one or more processors configured to perform the method of one or more of Aspects 17-28.

Aspect 36: An apparatus for wireless communication, comprising at least one means for performing the method of one or more of Aspects 17-28.

Aspect 37: A non-transitory computer-readable medium storing code for wireless communication, the code comprising instructions executable by a processor to perform the method of one or more of Aspects 17-28.

Aspect 38: A non-transitory computer-readable medium storing a set of instructions for wireless communication, the set of instructions comprising one or more instructions that, when executed by one or more processors of a device, cause the device to perform the method of one or more of Aspects 17-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    one or more memories; and
    one or more processors, coupled to the one or more memories, configured to:
        receive, from a network entity associated with a cell, an indication of a duplex capability of the cell and at least one key performance indicator (KPI) metric associated with the duplex capability of the cell, wherein the indication of the at least one KPI metric associated with the duplex capability of the cell indicates at least one of a downlink or uplink throughput metric associated with the cell, a downlink or uplink latency metric associated with the cell, or a downlink or uplink coverage metric associated with the cell; and
        perform a cell selection process based at least in part on the indication of the duplex capability of the cell and the at least one KPI metric associated with the duplex capability of the cell.

2. The apparatus of claim 1, wherein the indication of the duplex capability of the cell and the at least one KPI metric associated with the duplex capability of the cell are received via a remaining minimum system information message.

3. The apparatus of claim 1, wherein the cell is a preconfigured candidate cell for cell selection, and wherein the indication of the duplex capability of the cell and the at least one KPI metric associated with the duplex capability of the cell are received via a radio resource control message.

4. The apparatus of claim 1, wherein the indication of the duplex capability of the cell indicates that the cell is capable of one of half duplex operation or full duplex operation.

5. The apparatus of claim 4, wherein the indication of the duplex capability of the cell indicates that the cell is capable of full duplex operation, and wherein the indication of the duplex capability of the cell further indicates that the cell is capable of one of spatial-division-multiplexed full duplex operation or frequency-division-multiplexed full duplex operation.

6. The apparatus of claim 5, wherein the indication of the duplex capability of the cell further indicates that the cell is capable of frequency-division-multiplexed full duplex operation, and wherein the indication of the duplex capability of the cell further indicates a minimum guard band between an uplink band and a downlink band.

7. The apparatus of claim 1, wherein the indication of the at least one KPI metric associated with the duplex capability of the cell indicates the downlink or uplink throughput metric associated with the cell, wherein the downlink or uplink throughput metric associated with the cell comprises a downlink or uplink user perceived throughput metric associated with the cell.

8. The apparatus of claim 1, wherein the indication of the at least one KPI metric associated with the duplex capability of the cell indicates the downlink or uplink latency metric associated with the cell, wherein the downlink or uplink latency metric comprises a downlink or uplink turnaround latency metric associated with the cell.

9. The apparatus of claim 8, wherein the downlink or uplink turnaround latency metric associated with the cell is associated with at least one of:
- a turnaround time from a physical downlink shared channel (PDSCH) message to an acknowledgement message associated with the PDSCH message,
- a turnaround time from a scheduling request message to an uplink grant message associated with the scheduling request message,
- a turnaround time from a random access channel (RACH) message to another RACH message, or
- a turnaround time from a first-in-time RACH message to a last-in-time RACH message.

10. The apparatus of claim 1, wherein the indication of the at least one KPI metric associated with the duplex capability of the cell indicates the downlink or uplink coverage metric associated with the cell.

11. The apparatus of claim 10, wherein the downlink or uplink coverage metric associated with the cell is associated with at least one of:
- a downlink reference signal received power (RSRP) threshold to achieve a minimum downlink data rate or modulation and coding scheme (MCS),
- a path loss threshold to achieve the minimum downlink data rate or MCS, or
- an uplink RSRP threshold to achieve a minimum uplink data rate or MCS.

12. The apparatus of claim 1, wherein the indication of the at least one KPI metric associated with the duplex capability of the cell includes at least one of:
- an average value, over a time period, of the at least one KPI metric associated with the duplex capability of the cell,
- a percentile value, over the time period, associated with the at least one KPI metric associated with the duplex capability of the cell,
- a minimum value, over the time period, of the at least one KPI metric associated with the duplex capability of the cell,
- a maximum value, over the time period, of the at least one KPI metric associated with the duplex capability of the cell, or
- a time-filtered value of the at least one KPI metric associated with the duplex capability of the cell.

13. The apparatus of claim 1, wherein the one or more processors are further configured to:
receive, from another network entity associated with another cell, an indication of a duplex capability of the other cell and at least one KPI metric associated with the duplex capability of the other cell,
wherein performing the cell selection process is further based at least in part on the indication of the duplex capability of the other cell and the at least one KPI metric associated with the duplex capability of the other cell.

14. The apparatus of claim 13, wherein the one or more processors, to perform the cell selection process, are configured to select the cell based at least in part on the indication of the duplex capability of the cell indicating that the cell is capable of full duplex operation and the indication of the duplex capability of the other cell indicating that the other cell is not capable of full duplex operation.

15. The apparatus of claim 13, wherein the indication of the duplex capability of the cell indicates that the cell is capable of full duplex operation and the indication of the duplex capability of the other cell indicates that the other cell is also capable of full duplex operation, and
wherein the one or more processors, to perform the cell selection process, are configured to select the cell based at least in part on comparing the at least one KPI metric associated with the duplex capability of the cell with the at least one KPI metric associated with the duplex capability of the other cell.

16. The apparatus of claim 13, wherein the indication of the duplex capability of the cell indicates that the cell is not capable of full duplex operation and the indication of the duplex capability of the other cell indicates that the other cell is also not capable of full duplex operation, and
wherein the one or more processors, to perform the cell selection process, are configured to select the cell based at least in part on comparing the at least one KPI metric associated with the duplex capability of the cell with the at least one KPI metric associated with the duplex capability of the other cell.

17. The apparatus of claim 1, wherein the one or more processors, to receive the indication of the duplex capability of the cell and the at least one KPI metric associated with the duplex capability of the cell, are configured to:
receive, the indication of the duplex capability of the cell and the at least one KPI metric associated with the duplex capability of the cell, during the cell selection process.

18. A method of wireless communication performed by a user equipment (UE), comprising:
receiving, from a network entity associated with a cell, an indication of a duplex capability of the cell and at least one key performance indicator (KPI) metric associated with the duplex capability of the cell, wherein the indication of the at least one KPI metric associated with the duplex capability of the cell indicates at least one of a downlink or uplink throughput metric associated with the cell, a downlink or uplink latency metric associated with the cell, or a downlink or uplink coverage metric associated with the cell; and
performing a cell selection process based at least in part on the indication of the duplex capability of the cell and the at least one KPI metric associated with the duplex capability of the cell.

19. The method of claim 18, further comprising:
receiving, from another network entity associated with another cell, an indication of a duplex capability of the other cell and at least one KPI metric associated with the duplex capability of the other cell,
wherein performing the cell selection process is further based at least in part on the indication of the duplex capability of the other cell and the at least one KPI metric associated with the duplex capability of the other cell.

20. The method of claim 19, wherein the indication of the duplex capability of the cell indicates that the cell is capable of full duplex operation and the indication of the duplex capability of the other cell indicates that the other cell is also capable of full duplex operation, and
wherein performing the cell selection process includes selecting the cell based at least in part on comparing the at least one KPI metric associated with the duplex capability of the cell with the at least one KPI metric associated with the duplex capability of the other cell.

21. A non-transitory computer-readable medium storing a set of instructions, the set of instructions comprising:
one or more instructions that, when executed by one or more processors of a user equipment, cause the user equipment to:
receive, from a network entity associated with a cell, an indication of a duplex capability of the cell and at least one key performance indicator (KPI) metric associated with the duplex capability of the cell, wherein the indication of the at least one KPI metric associated with the duplex capability of the cell indicates at least one of a downlink or uplink throughput metric associated with the cell, a downlink or uplink latency metric associated with the cell, or a downlink or uplink coverage metric associated with the cell; and
perform a cell selection process based at least in part on the indication of the duplex capability of the cell and the at least one KPI metric associated with the duplex capability of the cell.

22. The non-transitory computer-readable medium of claim 21, wherein the indication of the duplex capability of the cell and the at least one KPI metric associated with the duplex capability of the cell are received via a remaining minimum system information message.

23. The non-transitory computer-readable medium of claim 21, wherein the cell is a pre-configured candidate cell for cell selection, and wherein the indication of the duplex capability of the cell and the at least one KPI metric associated with the duplex capability of the cell are received via a radio resource control message.

24. The non-transitory computer-readable medium of claim 21, wherein the indication of the duplex capability of the cell indicates that the cell is capable of one of half duplex operation or full duplex operation.

25. The non-transitory computer-readable medium of claim 24, wherein the indication of the duplex capability of the cell indicates that the cell is capable of full duplex operation, and wherein the indication of the duplex capability of the cell further indicates that the cell is capable of one of spatial-division-multiplexed full duplex operation or frequency-division-multiplexed full duplex operation.

26. The non-transitory computer-readable medium of claim 25, wherein the indication of the duplex capability of the cell further indicates that the cell is capable of frequency-division-multiplexed full duplex operation, and wherein the indication of the duplex capability of the cell further indicates a minimum guard band between an uplink band and a downlink band.

27. The non-transitory computer-readable medium of claim 21, wherein the indication of the at least one KPI metric associated with the duplex capability of the cell indicates the downlink or uplink throughput metric associated with the cell, wherein the downlink or uplink throughput metric associated with the cell comprises a downlink or uplink user perceived throughput metric associated with the cell.

28. The non-transitory computer-readable medium of claim 21, wherein the indication of the at least one KPI metric associated with the duplex capability of the cell indicates the downlink or uplink latency metric associated with the cell, wherein the downlink or uplink latency metric associated with the cell comprises a downlink or uplink turnaround latency metric associated with the cell.

29. The non-transitory computer-readable medium of claim 28, wherein the downlink or uplink turnaround latency metric associated with the cell is associated with at least one of:
a turnaround time from a physical downlink shared channel (PDSCH) message to an acknowledgement message associated with the PDSCH message,
a turnaround time from a scheduling request message to an uplink grant message associated with the scheduling request message,
a turnaround time from a random access channel (RACH) message to another RACH message, or
a turnaround time from a first-in-time RACH message to a last-in-time RACH message.

30. An apparatus, comprising:
means for receiving, from a network entity associated with a cell, an indication of a duplex capability of the cell and at least one key performance indicator (KPI) metric associated with the duplex capability of the cell, wherein the indication of the at least one KPI metric associated with the duplex capability of the cell indicates at least one of a downlink or uplink throughput metric associated with the cell, a downlink or uplink latency metric associated with the cell, or a downlink or uplink coverage metric associated with the cell; and
means for performing a cell selection process based at least in part on the indication of the duplex capability of the cell and the at least one KPI metric associated with the duplex capability of the cell.

* * * * *